United States Patent
Deurloo

(10) Patent No.: US 8,851,195 B2
(45) Date of Patent: Oct. 7, 2014

(54) DIFFERENTIAL DRY PIPE VALVE

(75) Inventor: David Deurloo, Liberty, SC (US)

(73) Assignee: The Reliable Automatic Sprinkler Co., Inc., Liberty, SC (US)

( * ) Notice: Subject to any disclaimer, the term of this patent is extended or adjusted under 35 U.S.C. 154(b) by 133 days.

(21) Appl. No.: 13/205,567

(22) Filed: Aug. 8, 2011

(65) Prior Publication Data

US 2013/0037278 A1    Feb. 14, 2013

(51) Int. Cl.
  *A62C 37/36*    (2006.01)
  *A62C 35/00*    (2006.01)
  *F16K 15/00*    (2006.01)
  *F16K 17/00*    (2006.01)
  *F16K 21/04*    (2006.01)
  *A62C 35/64*    (2006.01)
  *A62C 35/62*    (2006.01)
  *F16K 15/03*    (2006.01)
  *A62C 35/68*    (2006.01)

(52) U.S. Cl.
  CPC ............... *A62C 35/645* (2013.01); *A62C 35/62* (2013.01); *F16K 15/031* (2013.01); *F16K 15/03* (2013.01); *A62C 35/68* (2013.01)
  USPC .................. 169/22; 169/17; 169/19; 169/20; 137/527.8; 137/467; 137/516.25

(58) Field of Classification Search
  CPC ....... F16K 15/03; F16K 15/031; A62C 35/62; A62C 35/645; A62C 35/68
  USPC ............ 169/22, 17, 19; 137/467, 527, 527.8, 137/557, 516.29, 527.4
  See application file for complete search history.

(56) References Cited

U.S. PATENT DOCUMENTS

| 1,591,924 A | 7/1926 | Loepsinger |
| 1,699,706 A * | 1/1929 | Loepsinger ..................... 169/22 |

(Continued)

FOREIGN PATENT DOCUMENTS

KR    2001068523 A    7/2001

OTHER PUBLICATIONS

"Dry Pipe Valve", Central Sprinkler Company, Bulletin D PV2.2, pp. 1-12, Jul. 1996.

(Continued)

*Primary Examiner* — Len Tran
*Assistant Examiner* — Alexander M Valvis
(74) *Attorney, Agent, or Firm* — Fitzpatrick, Cella, Harper & Scinto

(57) ABSTRACT

A differential dry pipe valve is provided having a body including an inlet chamber having an inlet port, an exit chamber having an exit port, and a gasket flange positioned between the inlet and exit chambers facing the exit port, the inlet and exit ports being substantially aligned. The valve also includes a gasket attached to the gasket flange and an openable cover hingedly attached to the body. The gasket has an inner water lip in fluid communication with the inlet chamber and an outer air lip surrounding the water lip. The spacing between the water lip and air lip varies. The air and water lips are coaxial. The cover is configured to be sealingly engaged with the seal when in a closed position and to be sealingly disengaged in an open position when the pressure in the exit chamber is lower than the pressure in the inlet chamber. When the cover is in the open position, a direction of a path between the inlet and exit ports is substantially unaltered.

34 Claims, 14 Drawing Sheets

(56) References Cited

U.S. PATENT DOCUMENTS

| | | | | |
|---|---|---|---|---|
| 1,805,241 | A * | 5/1931 | Griffith | 169/21 |
| 1,932,324 | A * | 10/1933 | Rowley | 169/19 |
| 2,597,474 | A | 5/1952 | Griffith | |
| 2,900,029 | A | 8/1959 | Herkimer | |
| 4,321,942 | A * | 3/1982 | Duggan | 137/218 |
| 4,552,221 | A * | 11/1985 | Klein | 169/22 |
| 4,570,719 | A * | 2/1986 | Wilk | 169/20 |
| 4,854,342 | A * | 8/1989 | Polan | 137/516.29 |
| 5,671,769 | A * | 9/1997 | Booth et al. | 137/15.18 |
| 6,029,749 | A * | 2/2000 | Reilly et al. | 169/17 |
| 6,068,057 | A | 5/2000 | Beukema | |
| 6,543,474 | B2 * | 4/2003 | Fetterman, Jr. | 137/493.1 |
| 6,557,645 | B1 * | 5/2003 | Ringer | 169/22 |
| 6,668,858 | B1 * | 12/2003 | Bazargan | 137/559 |
| 6,752,217 | B2 | 6/2004 | Reilly | |
| 6,810,963 | B2 | 11/2004 | Ringer | |
| 7,104,333 | B2 * | 9/2006 | Ringer | 169/17 |
| 7,240,740 | B2 | 7/2007 | Reilly et al. | |
| 7,322,423 | B2 * | 1/2008 | Ringer | 169/17 |
| 7,673,695 | B2 * | 3/2010 | Deurloo | 169/17 |
| 7,814,983 | B2 * | 10/2010 | Ringer | 169/46 |
| 8,128,058 | B2 * | 3/2012 | Quinn et al. | 251/83 |
| 8,177,189 | B2 * | 5/2012 | Jackson et al. | 251/73 |
| 2006/0081292 | A1 * | 4/2006 | Sarno et al. | 137/527 |
| 2008/0105440 | A1 | 5/2008 | Jackson et al. | |
| 2008/0128026 | A1 | 6/2008 | Ringer | |
| 2008/0308159 | A1 | 12/2008 | Stunkard | |
| 2010/0071776 | A1 * | 3/2010 | Ringer et al. | 137/12 |
| 2011/0061751 | A1 * | 3/2011 | Jumpol | 137/527 |

OTHER PUBLICATIONS

"Dry Pipe Valve Model A**", Globe Fire Sprinkler Corporation, Bulletin DPV-D, Rev. #3, Feb. 2007.

"Model a Dry Pipe Valve", The Reliable Automatic Sprinkler Co., Inc., Bulletin 352 Rev. N., pp. 1-4, Oct. 2006.

* cited by examiner

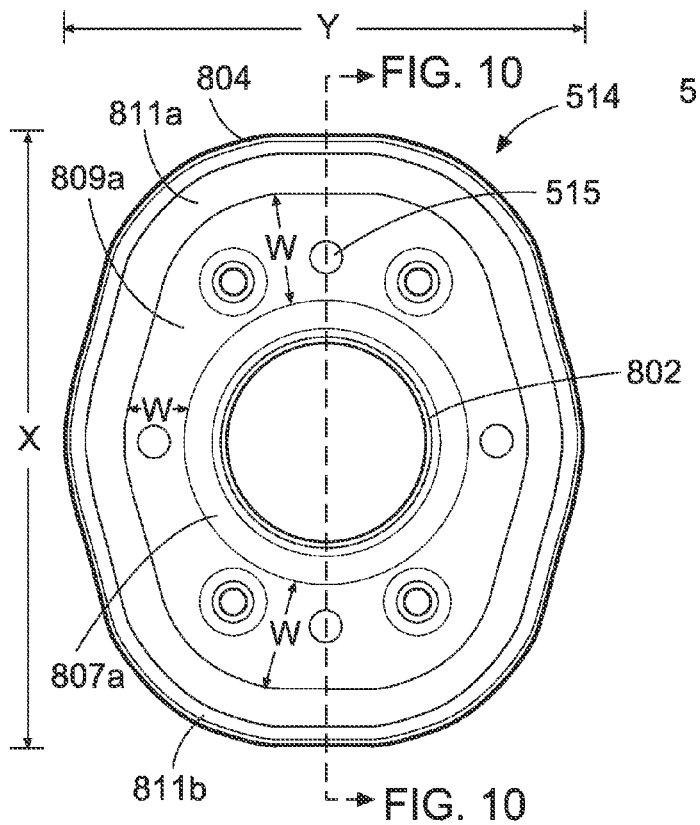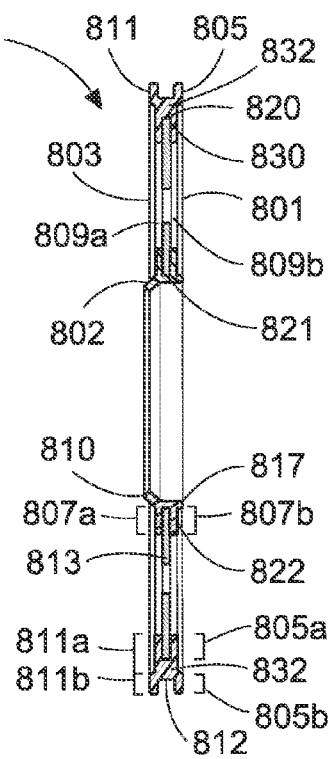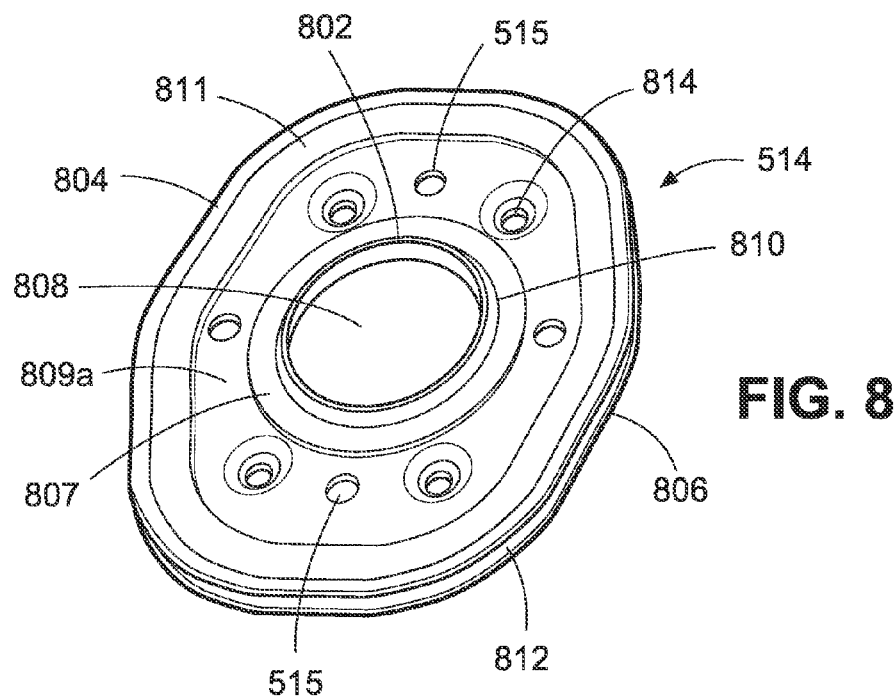

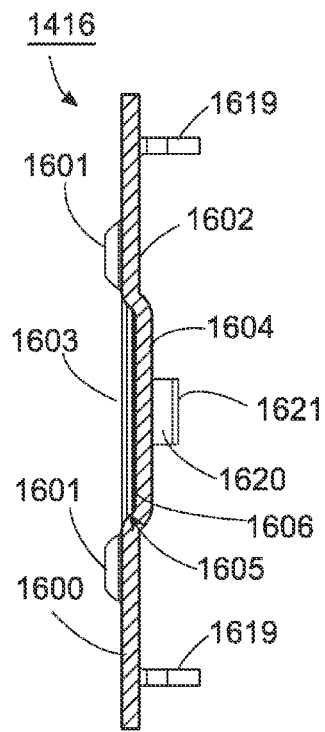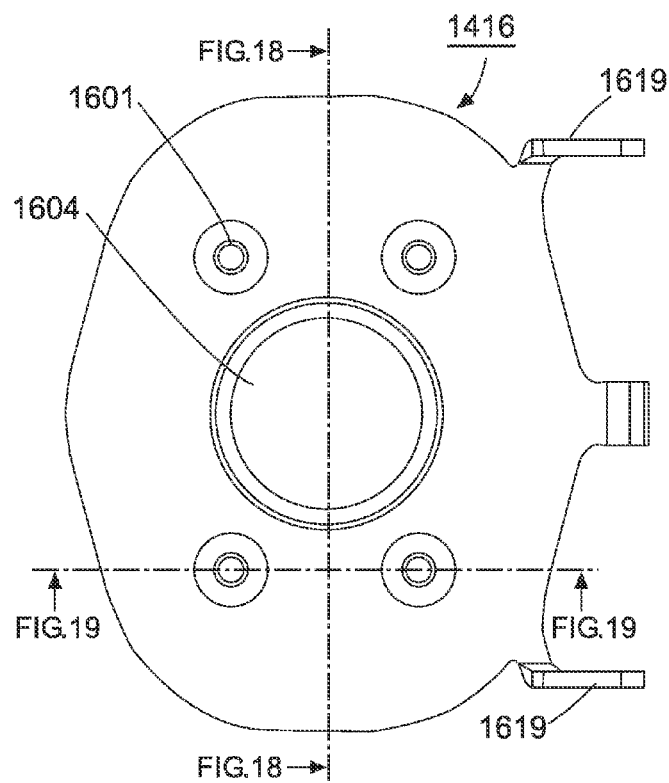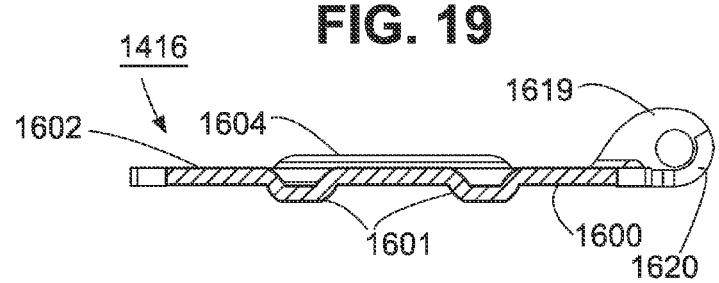

DIFFERENTIAL DRY PIPE VALVE

BACKGROUND OF THE INVENTION

Field of the Invention

This disclosure relates generally to valves for control of fluid flow, and in particular to differential dry pipe valves for use in fire suppression sprinkler systems.

A conventional fire protection system includes automatic sprinklers connected to a conduit to receive pressurized fire-extinguishing fluid, such as water. Such systems are referred to as "wet pipe" systems. A typical sprinkler has a base with a threaded portion for connection to the conduit and an output orifice to output the fluid to provide fire control and/or suppression. The output orifice is sealed by a seal cap, which is held in place by a release mechanism. The release mechanism is designed to release the cap under predetermined conditions, thereby initiating the flow of fire-extinguishing fluid. A typical release mechanism includes a thermally-responsive element, e.g., a frangible bulb or fusible link, and may also include a latching mechanism.

Certain fire protection systems have a central valve, referred to as a "dry pipe valve" or "deluge valve," that controls the flow of fire extinguishing fluid from a high pressure supply input to a system output connected to the sprinkler conduits. A typical dry pipe valve has a main chamber for controlling fluid flow from the supply input to the system output. The valve also has a secondary, i.e., "sensing" chamber, to which a fluid-based control line is connected. The valve maintains a balance (i.e., a pressure differential) between the pressure in the sensing chamber and the pressure in the fluid supply input line, which is sealed with a cover (referred to as a "clapper") in the main chamber. A pressure drop in the sensing chamber below a certain threshold allows the clapper to be forced open by the pressure in the supply line, thereby initiating the flow of fluid through the main chamber to the sprinkler system output.

In some dry pipe valve systems, the sprinkler conduits act as "wet pilot" lines. In such a system, the pilot lines are connected to the sensing chamber of the dry pipe valve. When a sprinkler is activated under fire conditions, the resulting drop in water pressure in the pilot lines (and sensing chamber) triggers the dry pipe valve to initiate the flow of fire-extinguishing fluid to the sprinklers. The sprinklers connected to the wet pilot lines then act to extinguish the fire. The fluid initially in the wet pilot lines can be an antifreeze solution or can be the same as the fire-extinguishing fluid.

In another dry pipe valve system, "dry pilot" lines may be used in applications in which wet pilot lines are not suitable, such as for refrigerated or sub-freezing storage. Dry pilot systems contain pressurized air or other gases, such as nitrogen, in the conduits connected to the sprinklers, rather than water. When a sprinkler is activated under fire conditions, the resulting drop in air pressure in the pilot lines triggers an actuator (which is usually a separate component from the valve), which in turn releases the fluid pressure in the sensing chamber. This causes the valve to open, as described above, and initiates the flow of fire-extinguishing fluid (e.g., water) to the sprinklers.

There are generally two types of dry pipe valves: mechanical and differential valves. Mechanical valves use a lever mechanism or the like to keep the valve closed until sufficient air loss occurs to operate an additional mechanism that allows for the lever to move off the clapper and operate the valve. Valves termed by the industry "differential dry pipe valves" operate, based on differences in pressure between the two sides of the clapper, to prevent or allow the water flow. A pressure differential is defined as the ratio of the air pressure to the water pressure that just allows the clapper to prevent the flow of water through the valve. When sufficient air loss occurs downstream of the clapper, and the pressure ratio of the air pressure to the water pressure becomes less than the differential, the clapper opens and allows the flow of water through the valve. The standard differential set by for all dry pipe valves has been established by Factory Mutual to be between 5:1 and 6.5:1.

Various configurations of the valve and clapper have been used. In a typical dry pipe differential valve, the valve includes a body, a seat, a clapper, a seal/gasket, a seal/gasket retainer, a hinge, and a cover. Moreover, in the typical arrangement of a dry pipe differential valve, the seat is machined in the body of the valve. With conventional manufacturing methods the machining needed to configure the seat to make it a suitable sealing surface adds significant cost to the manufacturing of the valve. The clapper is pinned to the body at a hinge and pivots to and away from the seat to allow or prevent passage of water through the valve. Also, a seal/gasket is typically attached to the clapper and the seal/gasket seals against the seat. Typical designs utilize a circular clapper, seal/gasket, and seat.

SUMMARY OF THE INVENTION

A differential dry pipe valve is provided that includes a body, a gasket, and a clapper. The body includes an inlet chamber having an inlet port, an exit chamber having an exit port, and a gasket flange between the inlet chamber and the exit chamber, the inlet and exit ports being substantially coaxial. The gasket flange has a sealing surface, which cooperates with a gasket, as described below. The gasket is attached to the gasket flange and has an inner water lip in fluid communication with the inlet chamber and an outer air lip surrounding the water lip. The spacing between the water lip and the air lip varies. The clapper is hingedly attached to the body and pivotally movable between a closed position, in which the clapper is sealed against the water lip and the air lip, and an open position, in which the clapper is not sealed against the water lip and the air lip. The clapper is attached to the body such that the clapper is movable from the closed to the open position based on a differential pressure between the inlet chamber and the exit chamber. When the clapper is in the open position, the inlet port and the exit port are in fluid communication and define substantially straight path for fluid flow along an axis passing through the inlet port and the exit port.

BRIEF DESCRIPTION OF THE DRAWINGS

FIG. 8 is an isometric view of the gasket seal of the valve of FIG. 1 viewed from the top and a side of the gasket seal.

FIG. 9 is a plan view of the upper surface of the gasket seal of FIG. 8.

FIG. 10 is a section view through section line 10-10 in FIG. 9.

FIG. 17 is a top plan view of the clapper shown in FIG. 16.

FIG. 18 is a section view of the clapper in FIG. 17 along section labeled "FIG. 18-FIG. 18" in FIG. 17.

FIG. 19 is a section view of the clapper in FIG. 17 along section labeled "FIG. 19-FIG. 19" in FIG. 17.

DETAILED DESCRIPTION OF THE INVENTION

Figure 1:
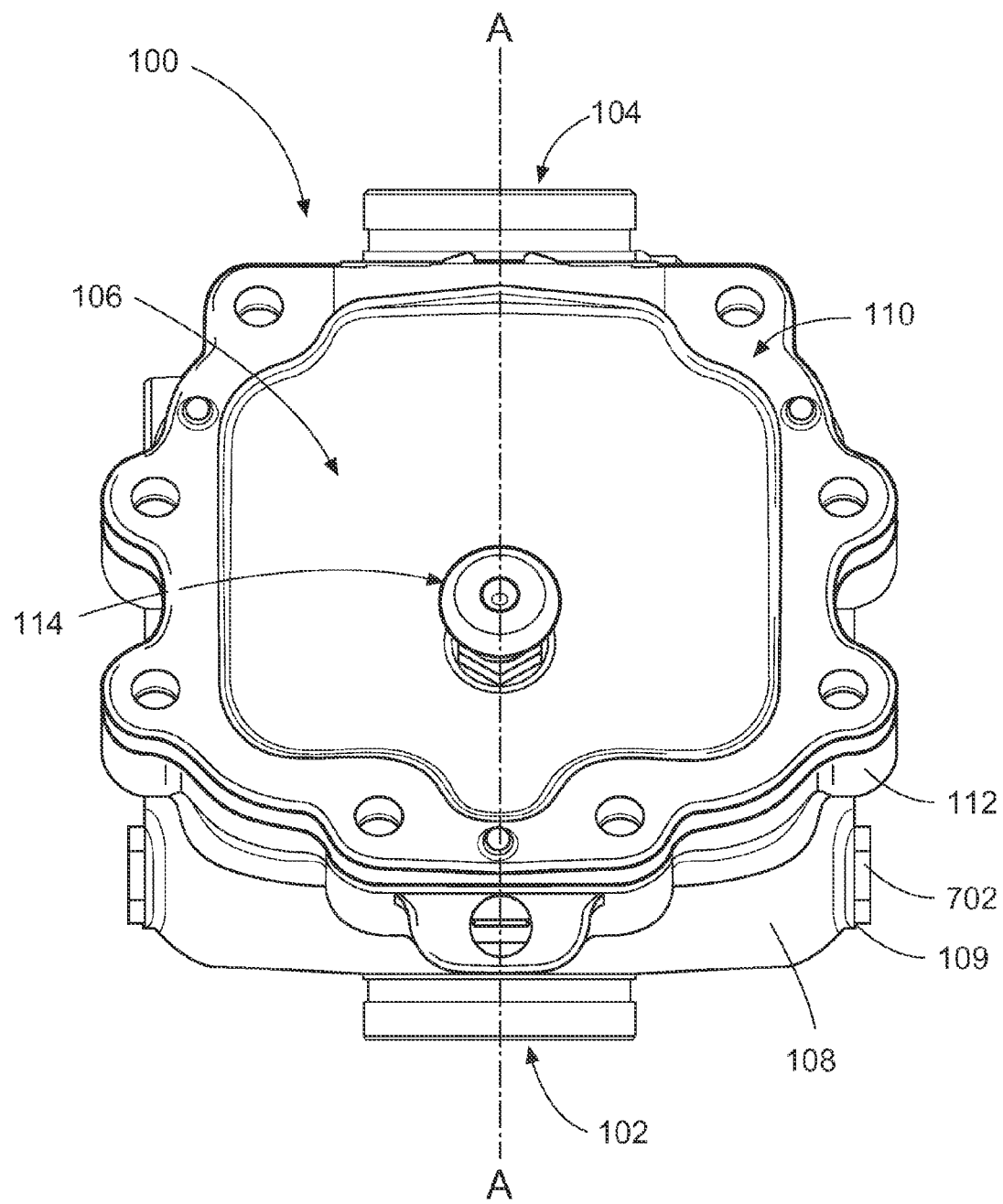
FIG. 1 is a front elevation view of an example embodiment of a differential dry pipe valve.

FIGS. 1-4 show an embodiment of a differential dry pipe valve 100 comprised of a body 108 that has an inlet port 102 and an exit port 104. The valve 100 is nominally sized according to the nominal pipe size to which the inlet port 102 and exit port 104 connect. For example, nominal sizes of the valve may include 2 inches, 2½ inches, 3 inches, 4 inches, and 6 inches. Unless noted otherwise, the specific dimensions discussed hereinbelow relate to embodiments of the valve having a nominal size of 4 inches. When installed the inlet port 102 is connected to a pressurized fluid supply, such as a supply of pressurized water, and the exit port 104 is connected to downstream piping which is pressurized with a fluid, such as nitrogen or air. As shown in FIG. 1, the body 108 also includes a cover 106 attached to the rest of the body 108 with fasteners (not shown) which join a flange 110 of the cover to a corresponding flange 112 of the body 108. The cover 106 also includes a reset mechanism 114 described in greater detail herein below. A portion of the reset mechanism 114 extends from the surface of the cover 106, as shown more clearly in FIGS. 2 and 3. As shown in FIGS. 1-4 the inlet port 102 and exit port 104 are substantially axially aligned with each other along axis A-A.

Figure 2:
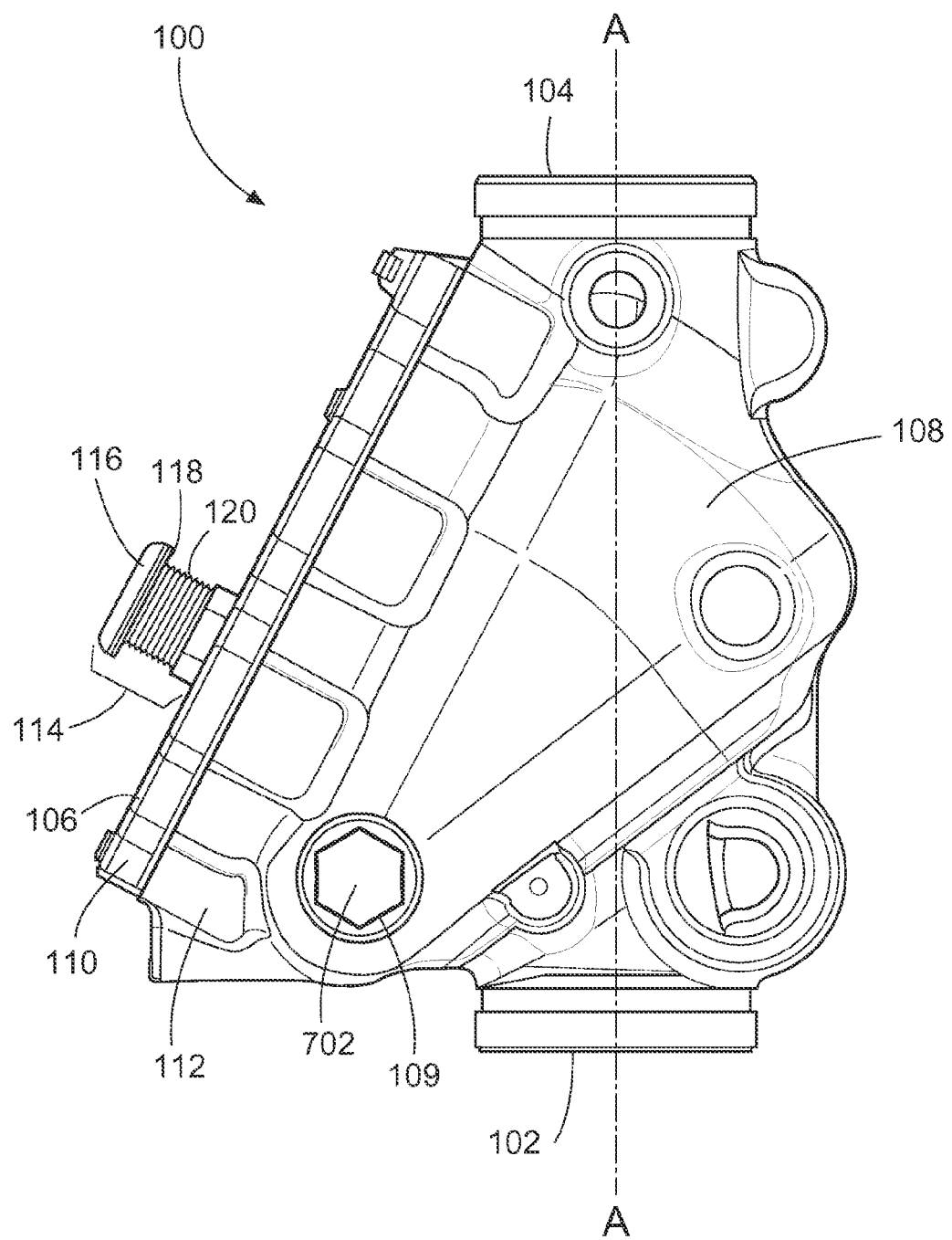
FIG. 2 is a side elevation view of the differential dry pipe valve of FIG. 1.
Figure 3:
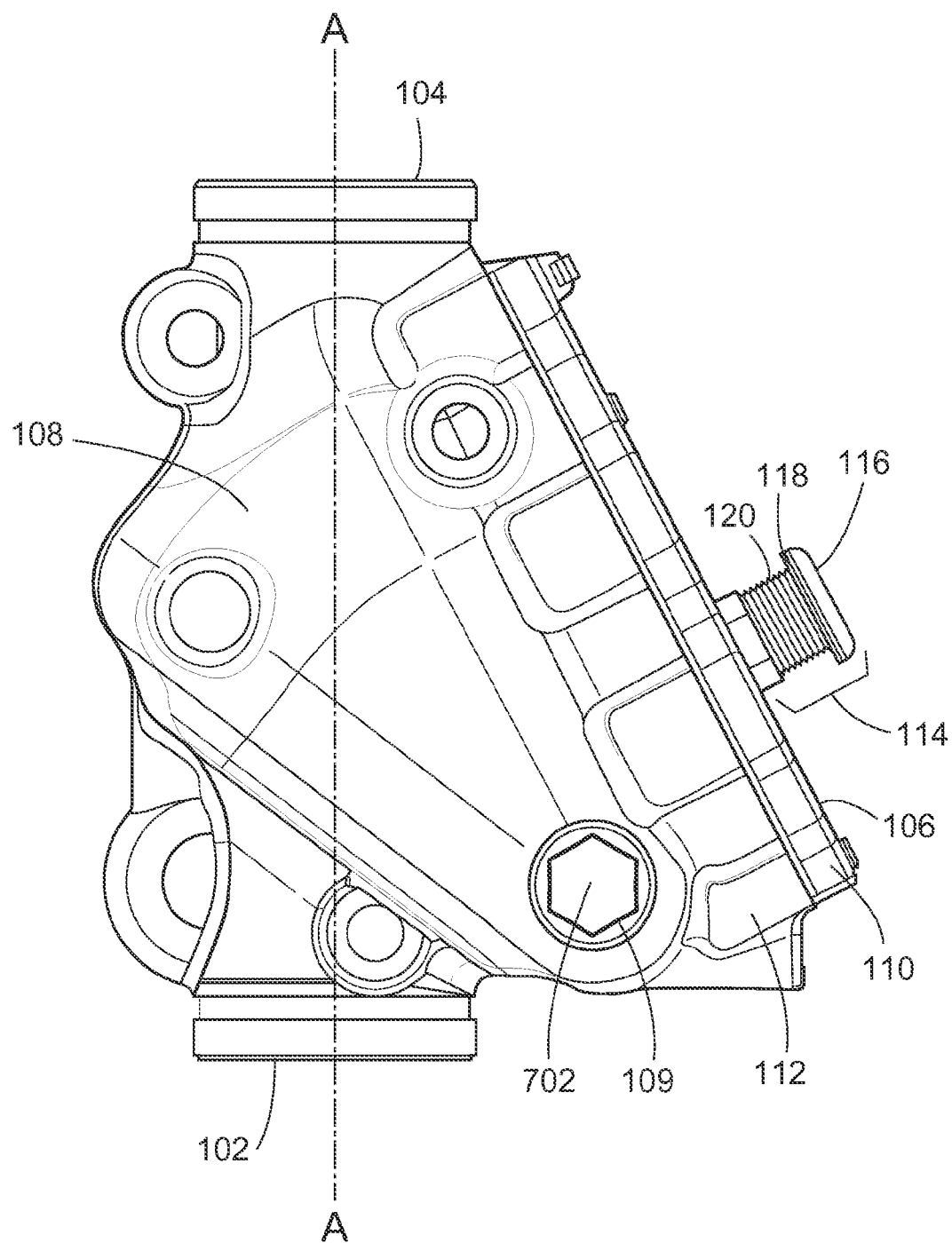
FIG. 3 is a side elevation view of the differential dry pipe valve of FIG. 1, viewed from a side opposite that in FIG. 2.
Figure 4:
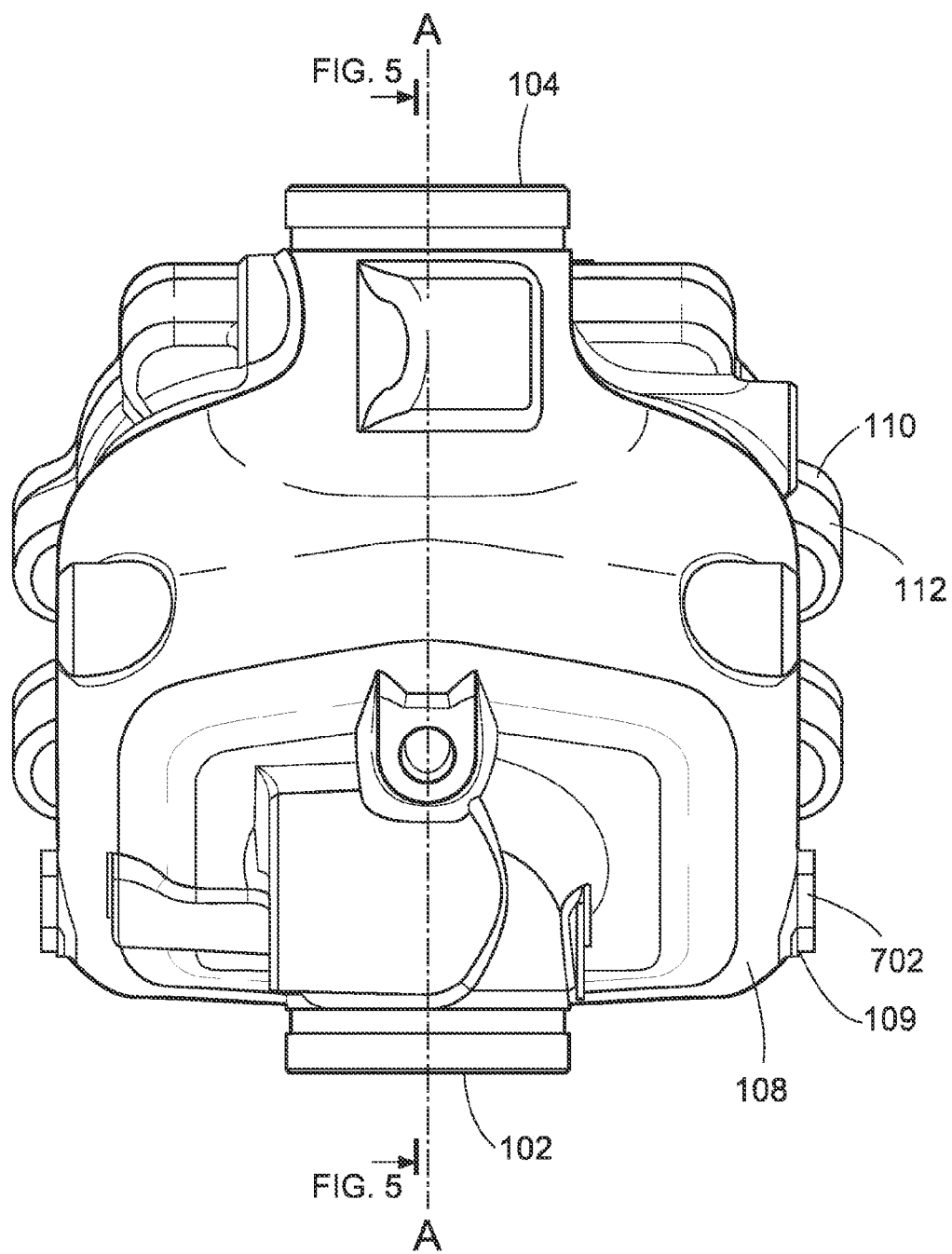
FIG. 4 is a rear elevation view of the differential dry pipe valve of FIG. 1, viewed from a side opposite that in FIG. 1.

FIG. 2 shows a side elevation view of the valve 100, and FIG. 3 shows another side elevation view of the valve 100 from a side opposite that in FIG. 2. As shown in FIGS. 2 and 3, the portion of the reset mechanism 114 that extends from the outer surface of the cover 106 includes a rod 118 having a spring retaining feature 116 at its outer end, biased outwardly in an assembled condition by a coil spring 120 that surrounds the rod 118. The reset mechanism is operated manually by pushing the rod 118 inwardly toward the cover 106 to compress the spring 120. When released by an operator, the reset rod 118 is returned to its original position by action of the spring 120.

Figure 5A:
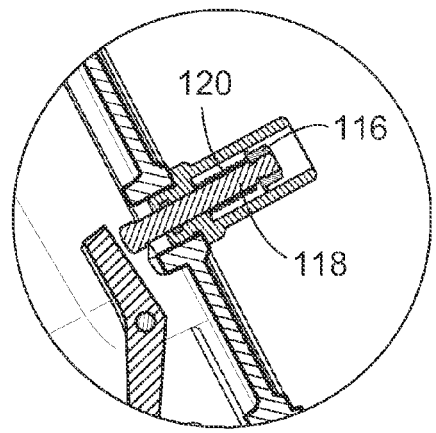
FIG. 5A is a cutaway section view of a portion of the dry pipe valve shown in FIG. 5 where the valve has been modified to include an alternate reset mechanism shown in FIG. 5B.
Figure 5:
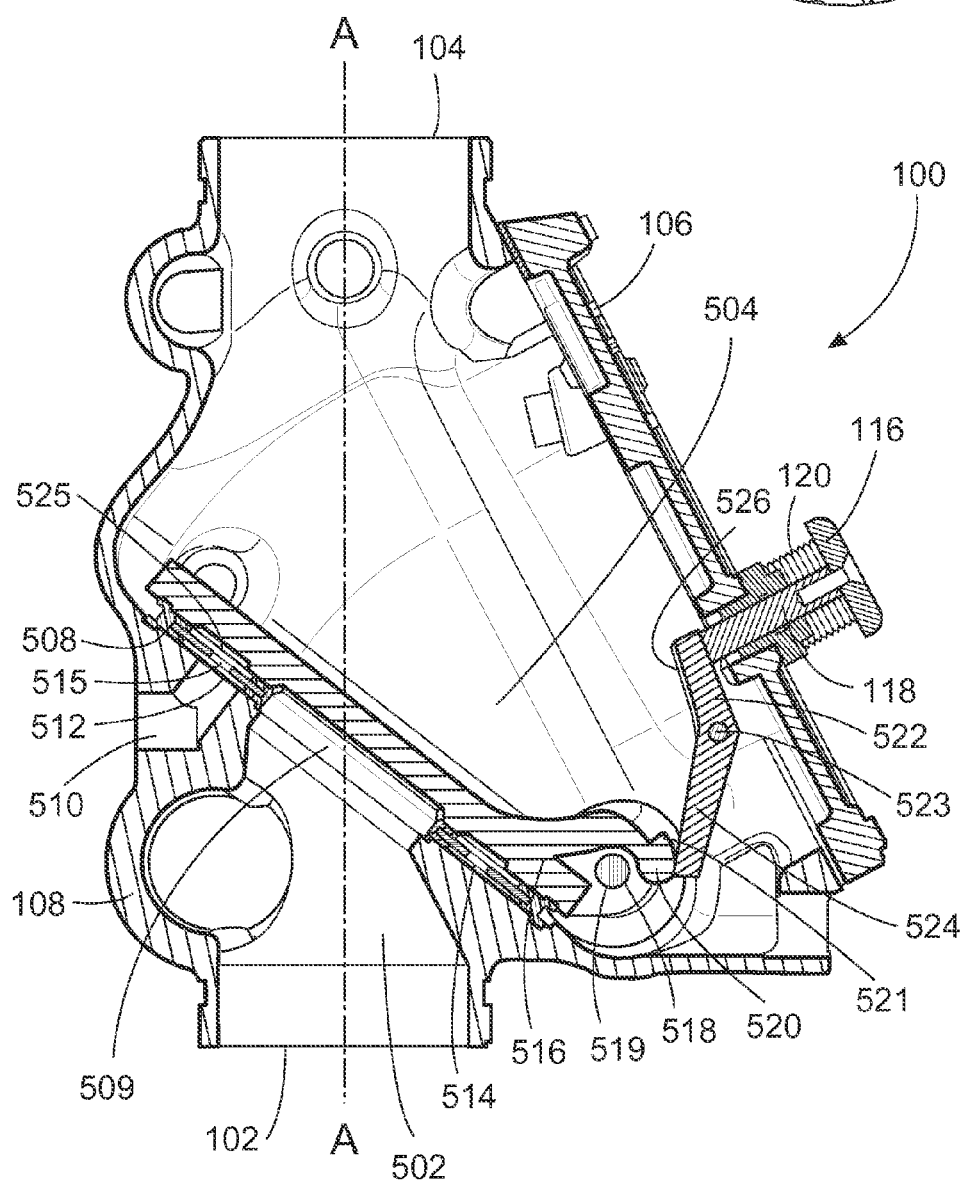
FIG. 5 is a section view of the dry pipe valve along section line 5-5 shown in FIG. 4 showing the clapper of the valve in a closed, set-up position.
Figure 5B:
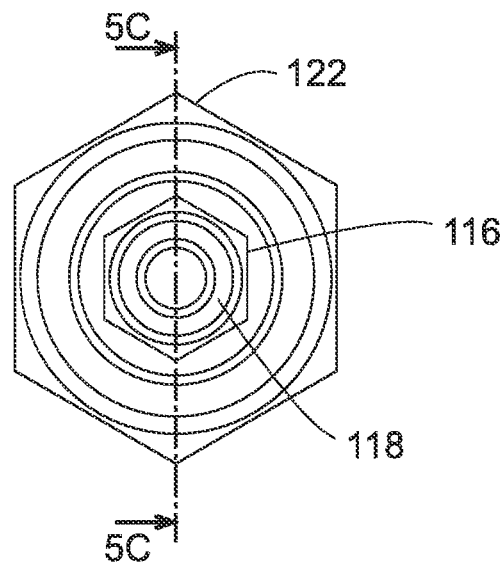
FIG. 5B is an elevation view of the alternate reset mechanism shown in FIG. 5A viewed from an end thereof.

The body 108 houses internal components of the valve 100, as follows. FIG. 5 is a section view of a valve 100, revealing the interior of the valve body 108 when the valve 100 is in a closed, set-up position. The interior of the valve 100 includes an inlet chamber 502 in fluid communication with the inlet port 102 for connection to a fluid supply at a supply pressure (not shown). The valve 100 also includes an exit chamber 504 in fluid communication with the exit port 104 for connecting to one or more fire protection sprinklers (not shown) downstream of the valve 100. As discussed above, in the set-up position, the downstream piping is pressurized sufficiently to maintain the valve in the closed position.

A gasket flange 508 is formed in the valve body 108 between the inlet chamber 502 and the exit chamber 504. The gasket flange 508 is oriented at a predetermined acute angle θ with respect to axis A-A through the inlet port 102 and exit port 104. In one embodiment, the gasket flange 508 is angled at 52.5 degrees with respect to axis A-A. The gasket flange 508 surrounds a through opening 509 in the body 108. The body 108 includes an alarm port 510 in fluid communication with an opening 512 at the surface of the gasket flange 508. The alarm port 510 is generally connected to ambient pressure.

A gasket 514 is attached to the gasket flange 508 with suitable fasteners (not shown) through openings 705 (FIG. 7) in the gasket in such manner as to effect a fluid-tight seal. The gasket flange 508 has a shape generally matching that of the gasket 514. In the preferred embodiment shown in FIGS. 7-9, the gasket 514 is generally polygonal. The gasket 514 has an inner water lip 802 (FIG. 8) defining an opening 808 (FIG. 8) coaxial with the opening 509 defined by the gasket flange 508. Openings 515 (FIG. 7) are also formed in gasket 514. The openings 515 are in fluid communication with the opening 512 in the gasket flange 508. Accordingly, the openings 515 are in fluid communication with the alarm port 510.

The valve 100 also includes a clapper 516 which is hingedly attached to the body 108 by hinges 519 and a hinge pin 518. The clapper 516 is constructed to seat against the gasket 514 to separate the inlet chamber 502 from the exit chamber 504. Thus, the arrangement shown in FIG. 5 represents the operating state when the valve is in the closed or setup position. In the closed position, fluid flow between the inlet chamber 502 and exit chamber 504 is prevented. The setup position is maintained when the pressure ratio between the exit chamber 504 and the inlet chamber 502 sufficient to maintain the clapper 516 seated against the gasket 514. In the embodiment of the valve 100 shown in FIG. 5, the differential is at least 5:1.

In a dry pipe system downstream piping connected to the exit chamber 504 is pressurized with a fluid, such as air or nitrogen, which exerts a force on the exit side 1101 (FIGS. 6 and 11) of the clapper 516, and holds the clapper 516 in a closed position in the presence of pressurized fluid bearing against the opposite, i.e., inlet side 1103 (FIG. 6) of the clapper 516. As shown in FIG. 5, the surface area of the clapper 516 exposed to the exit chamber 504 is larger than the surface area of the clapper 516 exposed to the inlet chamber 502. That difference in surface area contributes to a reduction in the pressure required in the exit chamber 504 to maintain the clapper 516 in the closed position.

Figure 6A:
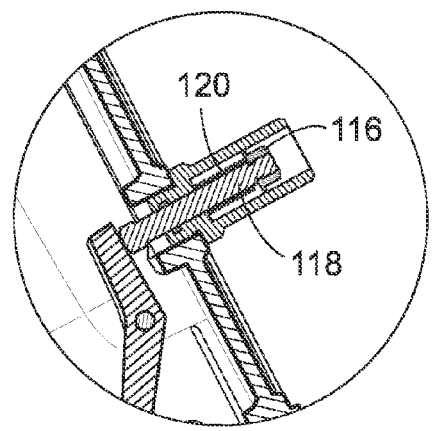
FIG. 6A is a cutaway section view of a portion of the dry pipe valve shown in FIG. 6 where the valve has been modified to include the alternate reset mechanism shown in FIGS. 5B and 5C.
Figure 6:
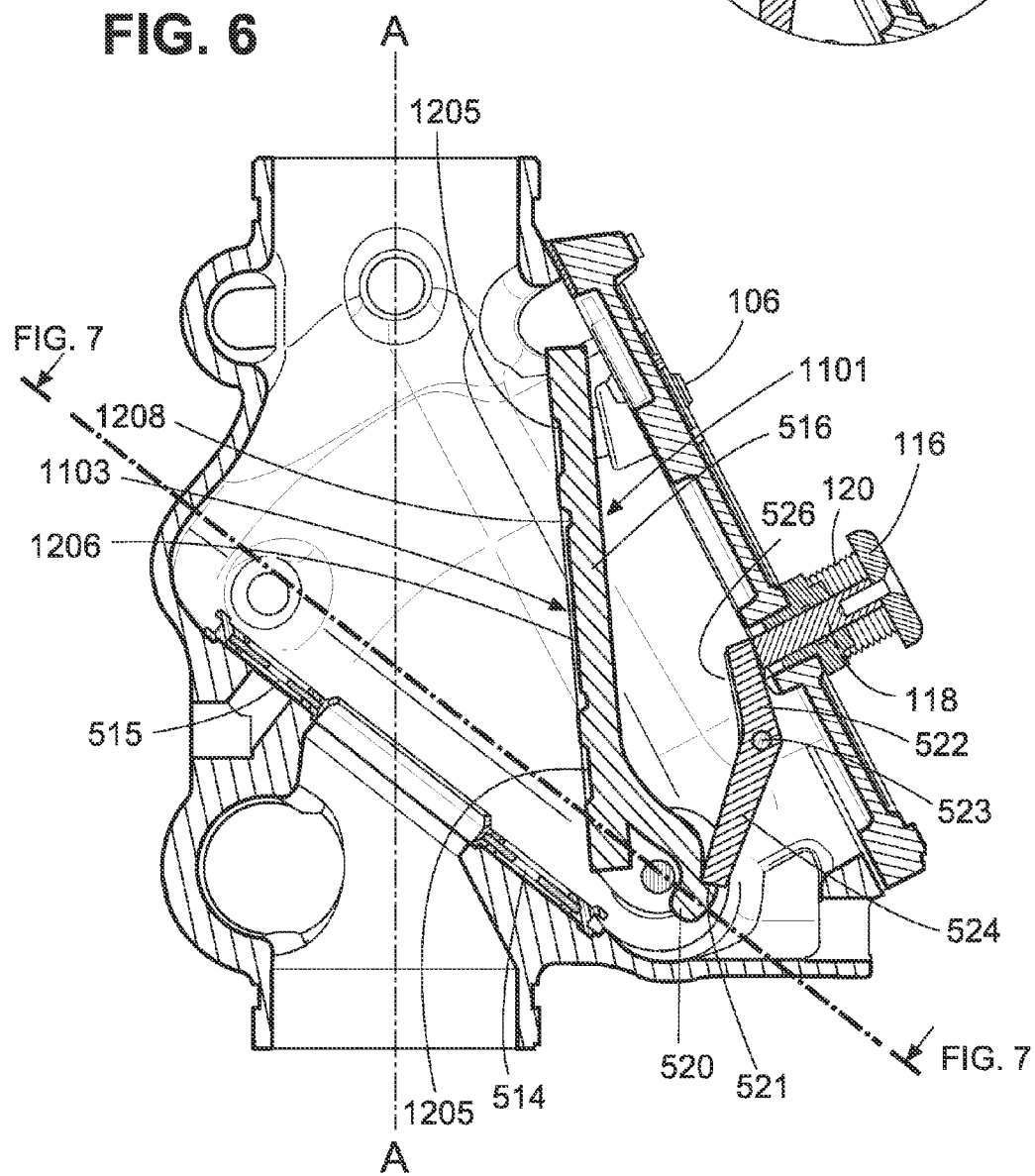
FIG. 6 is a view of the section shown in FIG. 5 with the clapper in an open, tripped position.

Also shown in FIG. 5, the clapper 516 includes a boss 520 extending from the clapper 516 near the hinges 519. The boss 520 includes a notch 521 which is constructed to engage a latch 522 upon rotation of the clapper 516 a predetermined angular displacement from the gasket 514. The latch 522 is pinned 523 to the cover 106, on an inner side of the cover 106 opposite the handle 116. The latch 522 is generally constructed as a lever, having one end 524 constructed to engage the boss 520 and another end 526 constructed to articulate with another end of the rod 118 of the reset mechanism 114. By virtue of the arrangement of the reset mechanism 114, the latch 522 is biased about its pinned connection 523 in a clockwise direction to maintain contact against the boss 520. Upon rotation of the clapper 516 from the closed to the open position, the boss 520 rotates (clockwise in FIGS. 5 and 6) until the boss 520 passes the lower end 524 of the latch 522, as shown in FIG. 6. Thereafter, the clapper 516 is prevented from rotating back to the closed, set-up position (e.g., FIG. 5) unless the reset rod 118 is pushed inward towards the cover 106. Pushing in on reset rod 118 rotates the latch 522 counterclockwise (in FIGS. 5 and 6) out of the notch 521 in the boss 520. Thereafter, the clapper 516 is permitted to rotate back towards the gasket 514 by virtue of its own weight.

The reset mechanism 114 and the latch 522 are attached to the cover 106 of the valve 100 and can be assembled together as an assembly. This design simplifies the manufacture and assembly of the valve 100. Moreover, the valve 100 is constructed so that when it is installed in a system, the cover 106 and, particularly, the rod 118 are disposed so that they are accessible to an operator. Accordingly, because the reset mechanism 114 is located on the cover 106 of the valve, the resetting procedure of the valve by the operator is facilitated.

An alternate reset mechanism 114a is shown in FIGS. 5A, 5B, 5C, and 6A. As shown most clearly in FIG. 5C, The mechanism 114a includes a rod 118 which is biased to the right in FIG. 5C by a spring 120. The reset mechanism 114a also includes a housing 122 partially surrounding the rod 118 and the spring 120. The housing 122 has an open end through which an operator can access the rod 118. The spring 120 is retained against the housing and a spring retaining feature 116 attached to the end of the rod 118. The end 123 of the rod 118 opposite the spring retaining feature 116 extends through a sealed end 124 of the housing 122 and is sealed by an o-ring 125 inserted in an annular groove 126. The end 123 of the rod is enlarged to act as a stop. The sealed end 124 of the housing 122 has threaded connection 127 and an annular flange 128. The threaded connection 127 is received by mating threads (not shown) in the cover 106, which aligns the end 123 of the rod 118 with the latch 522 inside the valve 100.

Figure 5C:
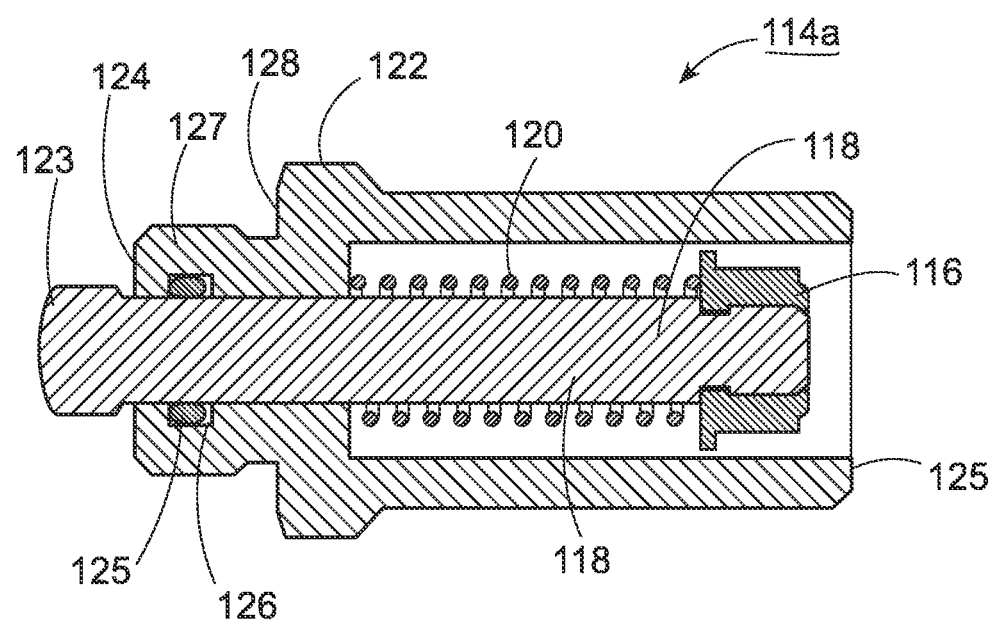
FIG. 5C is a section view of the alternate reset mechanism shown in FIGS. 5A and 5B along section line 5C-5C in FIG. 5B.

The reset mechanism 114a is shown in an unactuated condition in FIG. 5C, such as when the clapper is closed, as shown in FIG. 5. The corresponding elements of reset mechanism 114a operate in the same manner as those of mechanism 114 in valve 100. For example, the reset mechanism 114a can be reset by pushing inwardly on the rod 118 after the clapper is opened. By virtue of the features of mechanism 114a, the rod 118 is partially housed, which can mitigate inadvertent actuation of the reset mechanism 114a.

In many conventional dry pipe differential valves, the clapper sits in a closed position perpendicular to (or within about 10 degrees of perpendicular to) the direction of flow through the valve. When such conventional valves open, the clapper travels through an arc that is between 80 and 90 degrees. One feature of the exemplary embodiment of the valve 100 shown in FIG. 5 is that in the closed, set-up position, the clapper 516 is disposed at an angle less than 90 degrees with respect to the axis A-A. For example, in one example embodiment, in the set-up position, the clapper 516 is disposed at an angle of less than about 60°, and in a particularly preferred embodiment, about 50+/−5 degrees. When the clapper 516 moves from the set-up position to its fully open position, as shown in FIG. 6, the clapper 516 rotates and is stopped by the cover 106 after traveling only about 45 degrees. By virtue of the position of the clapper 516 in the set-up position, the clapper 516 rotates through an smaller angle of travel to its opened position as compared to conventional clapper designs. Moreover, by virtue of traveling through a smaller angle, the clapper 516 opens in a shorter time than that required by a conventional clapper. As a result of the shorter opening time, the clapper 516 has less time to accelerate before it contacts and is stopped by the cover 106, resulting in less risk of damage to the clapper 516 when it opens. Also, the reduced travel angle of clapper 516 contributes to a reduction in the height of the valve, making it more compact and thus easier to install in smaller spaces.

With the clapper 516 in a tripped, i.e., open position, as shown in FIG. 6, fluid (e.g. water) from the fluid supply is permitted to flow through the valve 100 from the inlet port 102 to the exit port 104. Unlike conventional differential dry pipe valves, fluid flowing through the valve 100 generally does not change direction between the inlet port 102 and the exit port 104. Rather, the direction of fluid flow through the valve 100 is substantially in a straight line path along axis A-A. This relatively straight fluid flow path helps to reduce pressure loss through the valve 100 and permits the valve 100 to be constructed with smaller dimensions than conventional differential dry pipe valves of similar nominal sizes. Also, the reduced pressure drop allows the valve 100 to be used in systems that operate at lower supply pressure. A smaller valve may reduce material and handling costs required for manufacturing, transportation, and storage as compared to a larger conventional valve. Lower supply pressure operation also allows systems to be designed with a reduced need for booster pumps which are often used to increase the water pressure from municipal supplies. Likewise, the larger surface area of the exit side 1101 (FIG. 11) of the clapper 516 exposed to air pressure may permit a smaller compressor to maintain air pressure on the exit (i.e., downstream) side of the clapper.

Figure 7:
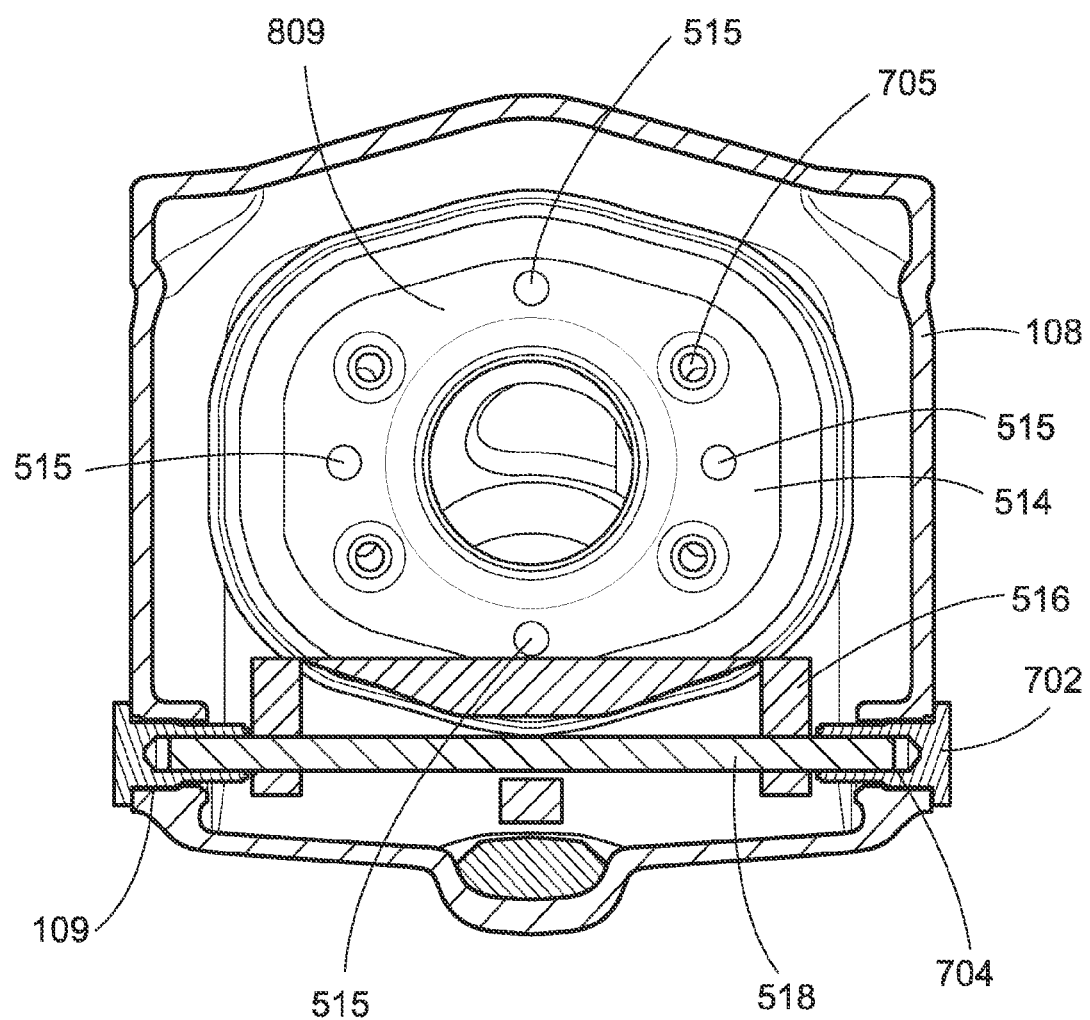
FIG. 7 is a section view through section line 7-7 shown in FIG. 6.

FIG. 7 shows a view of the interior of the body 108 of the valve 100 with the cover 106 removed and the clapper 516 in its fully open position. The clapper 516 is shown attached to and centered with the hinge pin 518 between inwardly extending bushings 702. The bushings 702 are threaded around their outer surface to engage corresponding threads in through openings 109 in the valve body 108. The bushings 702 have an opening 704 to receive the ends of the hinge pin 518. The bushings 702 are configured to form a fluid tight connection with the body 108.

The gasket 514 will now be described in greater detail with reference to FIGS. 7-10. The gasket 514 is formed of an elastomer 822 and a metal plate 813. The metal plate 813 and elastomer are generally co-planar. The metal plate 813 has an outer edge 820 surrounded by an air lip 804 and has an inner edge 821 surrounded by a water lip 802. The air lip 804 and the water lip 802 are formed from the elastomer 822. While the gasket 514, air lip 804, and water lip 802 are shown in the embodiment in FIGS. 7-10 as having particular overall shapes, it will be appreciated that the gasket, air lip and water lip may have other shapes as will be appreciated by those of ordinary skill in the art.

The air lip 804 and the water lip 802 are spaced from each other by a distance "W". In the specific embodiment shown in FIGS. 7-10, the spacing W is non-uniform. That is, the space W along the major dimension "X" is larger than the space W along the minor dimension "Y". However, in other embodiments, the spacing W may be uniform. Moreover, in one embodiment of the valve having a nominal size of 4 inches where the spacing W is non-uniform, the smallest spacing may be about 0.843 inch and the largest spacing may be about 1.563 inches. The spacing between the air lip and the water lip can be configured to benefit some aspects of the invention.

The space between the air lip 804 and the water lip 802 defines an area of the clapper 516 which, when exposed to an intermediate pressure between the clapper 516 and the gasket 514, exerts a force on the clapper 516 tending to open the clapper 516. As the surface area between the air lip 804 and water lip 802 increases, so does the force exerted on the capper 516 as a result of the intermediate pressure. Accordingly, by varying the spacing between the air lip 804 and water lip 802, the pressure needed to keep the clapper 516 closed in the set-up position can be effectively reduced.

Moreover, the spacing between the air lip 804 and water lip 802 can be varied to make the valve 100 more compact. For example, the larger spacing along the major dimension "X" between the air lip 804 and water lip 802 in FIGS. 7-10 allows for a more compact gasket 514 and clapper 516 along the minor "Y" dimension, while still providing a differential of at least 5:1. The shorter clapper 516 travels through a smaller arc than a conventional clapper of the same nominally sized valve when it opens, which thereby reduces the time it takes to open the clapper 516.

While the gasket 514 shown in the particular example embodiment in FIGS. 7-10 has a generally polygonal outer shape, the invention is not limited to a polygonal shape, and other gasket shapes are possible and are within the scope of the invention. The gasket 514 shown in FIGS. 7-10 has a generally rectangular shape, and more specifically, the gasket has a modified rectangular shape shown in FIGS. 7-9. As shown in FIGS. 7-9, the gasket 514 is generally rectangular, but has rounded corners and has a bulge at the center along a minor dimension Y. For example, in one example embodiment of a valve having a nominal size of 4 inches where the gasket 514 has the shape shown in FIG. 9, the major dimension "X" of the gasket 514 may be about 9.125 inches and the minor dimension "Y" may be about 7.75 inches.

As shown in FIGS. 8 and 9 the metal plate 813 includes a plurality of counterbored holes 814 which are located in a recessed groove 809 of the gasket 514 formed between the water lip 802 and the air lip 804. The counterbored holes 814 are used for attaching the gasket 514 to the gasket flange 508 with fasteners (not shown). The holes 814 are counterbored to recess portions of such fasteners below or flush with the surface of the gasket 514. The metal plate 813 provides structural rigidity to the gasket and acts as a backing plate to spread the compressive force from the fasteners from the plate 813 to the water lip 802 and the air lip 804 and prevents warping of the gasket 514.

In one embodiment, the metal plate 813 is formed from a stainless steel, and the elastomer 822 is formed of rubber, which is vulcanized onto the metal plate 813. For example, the elastomer 822 can be made of various types of materials including silicone, ethylene propylene diene monomer rubber (EPDM), and fluoroelastomers, such as various types of FKMs defined in ASTM D1418, including Viton® rubber (manufactured by DuPont Performance Elastomers L.L.C., of which Viton is a registered trademark). The elastomer 822 is selected to seal with the gasket flange 508 and the clapper 516. Viton is a brand of synthetic rubber and fluoropolymer elastomer commonly used in O-rings and other moulded or extruded goods. Viton fluoroelastomers are categorized under the ASTM D1418 & ISO 1629 designation of FKM. This class of elastomers is a family comprising copolymers of hexafluoropropylene (HFP) and vinylidene fluoride (VDF or VF2), terpolymers of tetrafluoroethylene (TFE), vinylidene fluoride (VDF) and hexafluoropropylene (HFP) as well as perfluoromethylvinylether (PMVE) containing specialties.

The gasket 514 has an inlet side 801 (FIG. 10) and an exit side 803 (FIGS. 8 and 9). The inner water lip 802 is surrounded by, and spaced from, the outer air lip 804. The water lip 802 is constructed to contact the clapper 516 in its closed position to prevent the pressurized fluid supply (e.g., water) from escaping past the clapper 516. The gasket 514 has an inner circular opening 808 defined by the water lip 802. In one example embodiment shown, the diameter of the opening 808 defined by the water lip 802 can be about 3.2 inches. The water lip 802 has a frustoconical portion 810 extending from the exit side 803 of the gasket 514 (this feature is easiest to see in profile in the cross-section shown in FIG. 10). In one embodiment, the frustoconical portion 810 tapers radially inwardly at about 50 degrees with respect to the plane of the gasket 514. Of course while the cross-section of the water lip 802 is shown as having a frustoconical shape, other cross-sections are possible, such as, a cross-section having an arcuate shape. The water lip 802 has annular flanges 807a and 807b extending radially outward forming a groove in which an inner edge 821 of the metal plate 813 is received. On the exit side 803, the annular flange 807a and the frustoconical portion 810 are designed to contact the clapper 516 in the closed position, while on the inlet side 801, the annular flange 807b is designed to contact the gasket flange 508. For example, in one example embodiment of a valve having a nominal size of 4 inches, the annular flanges 807a and 807b may each have a width of about 0.42 inch.

As shown in FIGS. 8-10, the air lip 804 is formed substantially as a channel which surrounds the outer edge 820 of the metal plate 813. The air lip 804 has an inner U-shaped groove 830 that receives the outer edge 820 of the metal plate 813. Viewed from a cross-section of the air lip 804 shown in FIG. 10, the air lip 804 also has an outer V-shaped groove 812 extending in an opposite direction from the groove 830. The inner groove 830 and outer groove 812 are defined by air lip flanges 811 and 805 and base 832, which separates the inner and outer grooves. The inner groove 830 is defined by air lip flange portions 811a and 805a which extend inwardly from the base 832. The outer groove 812 is defined by air lip flange portions 811b and 805b which extend outwardly from the base 832. The air lip flange portions 811b and 805b extend at a slight angle with respect to portions 811a and 805a, respectively, to form the V-shaped groove 812. In one example embodiment, the dimensions of air lip flanges 811 and 805 are substantially equal. For example, in one embodiment of a valve having a nominal size of 4 inches, the width of the air lip flanges 811 and 805 is about 0.875 inch, the thickness of the gasket 514 between the air lip flange portions 811b and 805b is about 0.5 inch, and the thickness of the gasket 514 between the air lip flange portions 811a and 805a is about 0.375 inch. The air lip flange 811 is constructed to contact an area of the clapper 516 proximate the outer edge of the clapper 516 in its closed position to seal pressurized fluid (e.g., air) downstream of the clapper 516.

As shown in FIGS. 8 and 9, the air lip 804 and the water lip 802 are coaxial and symmetric. As shown in FIGS. 8-10, on both sides of the gasket 514, radially adjacent in the outward direction from the annular flanges 807a and 807b are recessed grooves 809a and 809b, respectively. On the exit side 803, the recessed groove 809a has a non-uniform width "W" which extends between the annular flange 807a and the air lip flange 811 of the air lip 804. Also, on the inlet side 801, recessed groove 809b has the corresponding dimensions as recessed groove 809a. In the embodiment shown in FIGS. 8-10, the annular flange 807a and the air lip flange portion 811a are substantially coplanar. Moreover, the annular flange 807b and the air lip flange portion 805a are generally coplanar. As shown in FIG. 10, on the inlet side 801 of the gasket 514 the water lip 802 extends slightly from the surface of the gasket 514 forming an annular ridge 817 which is constructed to seal against the opening in the gasket flange 508.

Figure 11:
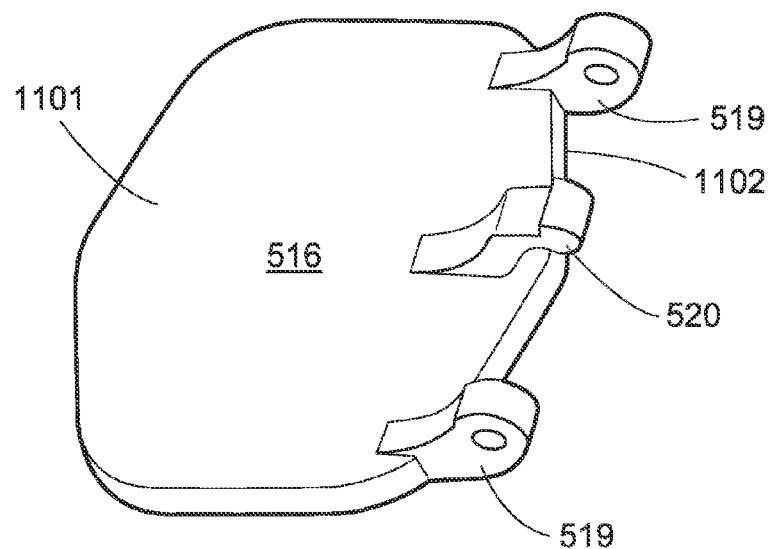
FIG. 11 is an isometric view of the clapper of the valve of FIG. 1 viewed from the top and a side of the clapper.

The clapper 516 will now be described with reference to FIGS. 11-13. As shown in FIG. 11 the exit side 1101 of the clapper 516 has the same modified rectangular shape as the gasket 514. Hinges 519 extend from an outer edge 1102 of the clapper 516 while the boss 520 extends between hinges 519 from the exit side of the clapper 516.

Figure 12:
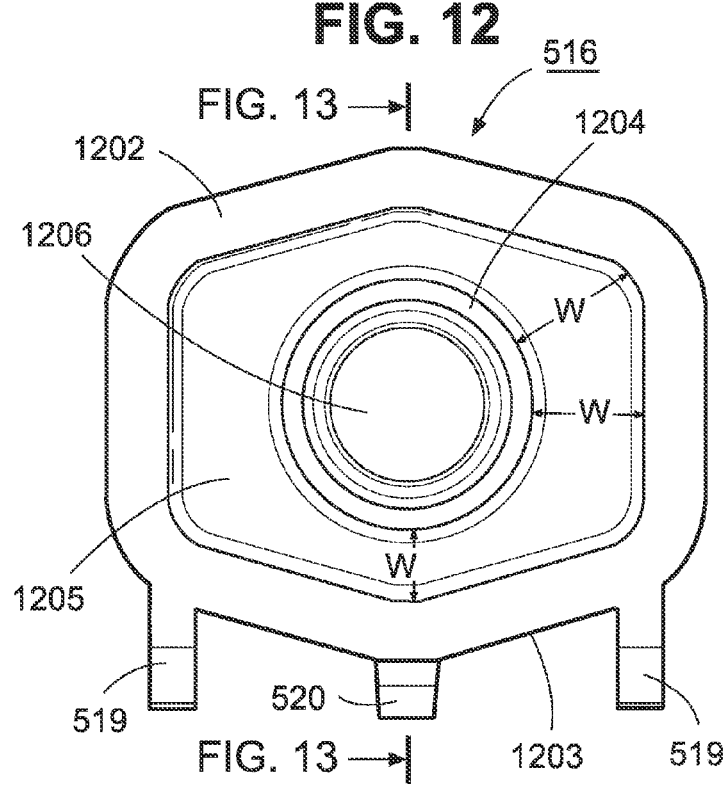
FIG. 12 is a plan view of the lower surface of the clapper of FIG. 11.
Figure 13:
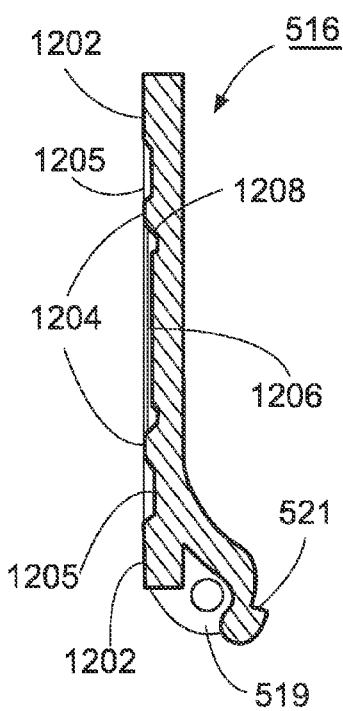
FIG. 13 is a section view through section line 13-13 in FIG. 12.

FIG. 12 shows a view of the inlet side 1103 of the clapper 516. The clapper 516 has a pair of flanges: an outer air seal flange 1202 and an inner water seal flange 1204. At the center of the clapper 516 a cylindrical recess 1206 is formed having a tapered peripheral edge 1208 constructed to conform and seal with the frustoconical portion 810 (FIGS. 8-10) of the water lip 802 (FIGS. 8-10) when the clapper 516 is in the closed position (e.g., FIG. 5). The water seal flange 1204 is formed adjacent to, and radially outward of, the tapered peripheral edge 1208. The water seal flange 1204 is shown as being generally circular. Radially outward and adjacent to the water seal flange 1204 is a groove 1205 which has a non-uniform width "W" (FIG. 12) between the air seal flange 1202 and the water seal flange 1204. The groove 1205 corresponds to groove 809a formed in the gasket 514. The air seal flange 1202 extends adjacent to and radially outward from the groove 1205.

When the clapper 516 is in the closed position, water seal flange 1204 seats against annular flange 807a and air seal flange 1202 seats against the air lip flange 811. When the clapper 516 is in the closed position, the water lip 802 of gasket 514 defines an area 1206 on an inlet side 1203 of the clapper 516 which is less than the overall area of the inlet side 1203 of the clapper 516. Therefore, supply pressure effectively acts only on the portion of the clapper 516 defined by the water lip 802. Acting to counter the force exerted by the fluid supply pressure is the fluid pressure in the exit chamber 504, which acts on the entire surface of the exit side 1101 of the clapper 516. Because the fluid pressure in the exit chamber 504 acts on a larger area compared to the fluid supply pressure, the fluid pressure in the exit chamber 504 needed to produce a force to maintain the clapper 516 closed can be reduced.

Moreover, as a result of the clapper 516 arrangement, when the clapper 516 is in the closed position an intermediate chamber 525 (FIG. 5) is defined between groove 1205 and the gasket flange 508. The intermediate chamber 525 is in communication with the alarm port 510 through opening 512 in the gasket flange 508. As a result, when the clapper 516 is in the closed position, the intermediate chamber 525 is maintained at ambient pressure. The intermediate pressure effectively acts on a portion of the inlet side of the clapper 516 defined by the groove 1205.

The arrangement of attaching the gasket 514 to the valve body 108 is different from conventional dry pipe valves. In conventional differential dry pipe valves, a gasket is usually not attached to the valve body at all, but instead is attached to the inlet side (i.e., underside) of the clapper. Such conventional arrangements also require a carefully machined valve seat to be machined into the body of the valve body between the inlet chamber and the exit chamber. Furthermore, in typical differential dry pipe valves, both the air lip and water lip sealing surfaces are generally of the same shape, and typically are both circular.

Contrary to such conventional arrangements, the gasket 514 in the exemplary embodiment shown in FIGS. 8-10 is constructed to be affixed to the valve body 108 rather than the clapper 516. Moreover, in the example embodiment shown in FIGS. 8-10, the air lip 804 is generally polygonal in shape, rather than circular. The polygonal design contributes to reducing the overall dimensions of the valve, which reduces the space needed to install the valve.

The air lip 804 and the water lip 802 produce a seal with the clapper 516 that becomes more secure as the pressure acting on the exit side 1101 and the inlet side 1203 increases. One benefit to this design is that the clapper 516 can be sealed during a reset procedure without the need to introduce priming water into the exit chamber 504. Indeed, the frustoconical surface 810 of the water lip 802 aids in aligning the clapper 516 onto the gasket 514 and pressure alone in the exit chamber 504 is sufficient to seal the clapper 516 closed prior to reintroducing water in the inlet chamber 502 after resetting the clapper 516.

Figure 14:
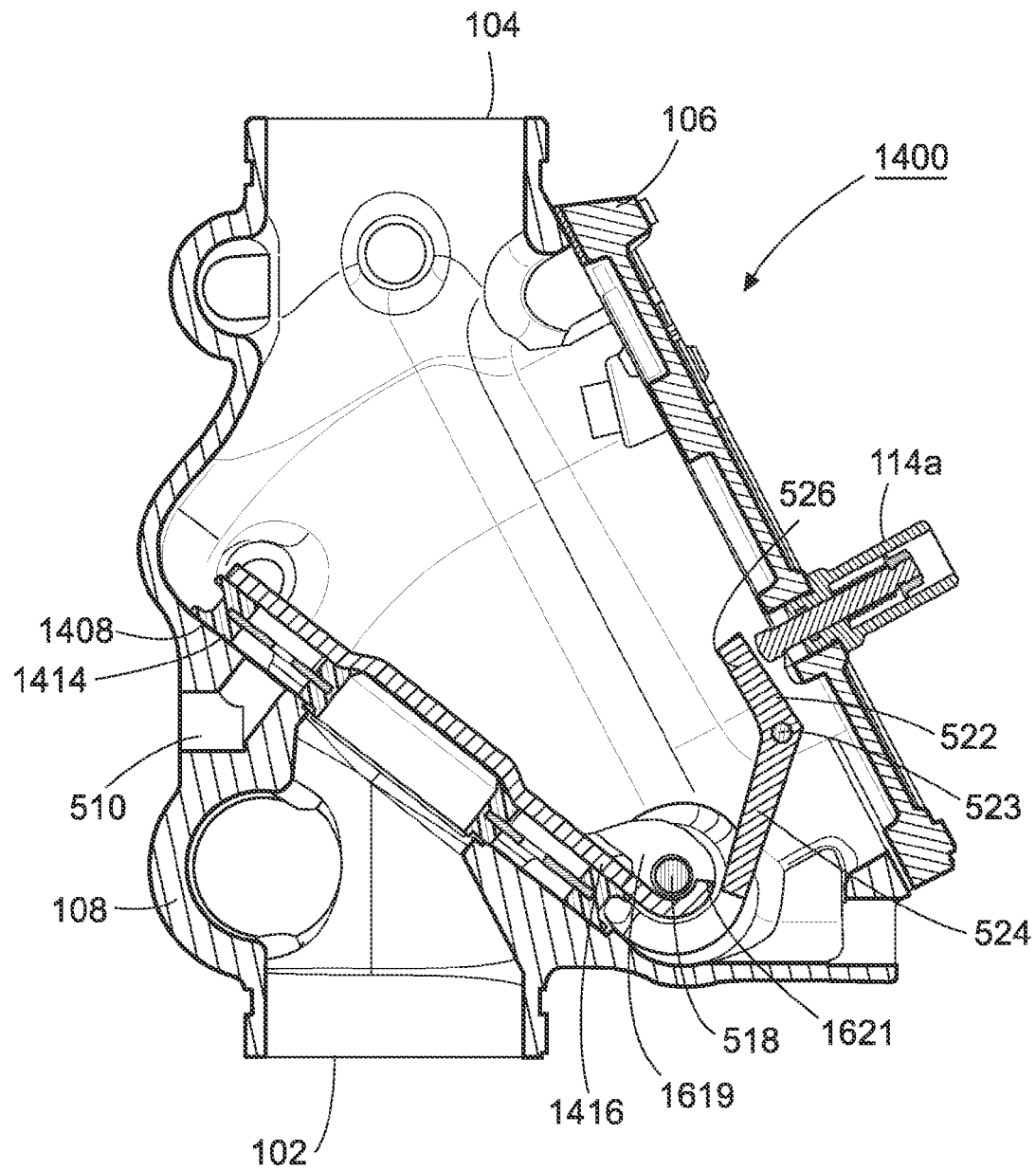
FIG. 14 is a section view of another embodiment of a valve having the same housing as the dry pipe valve of FIGS. 1-3 viewed along section line 5-5, where the valve has been modified to include an alternate clapper and gasket seal and where the clapper is in a closed, set-up position.
Figure 15:
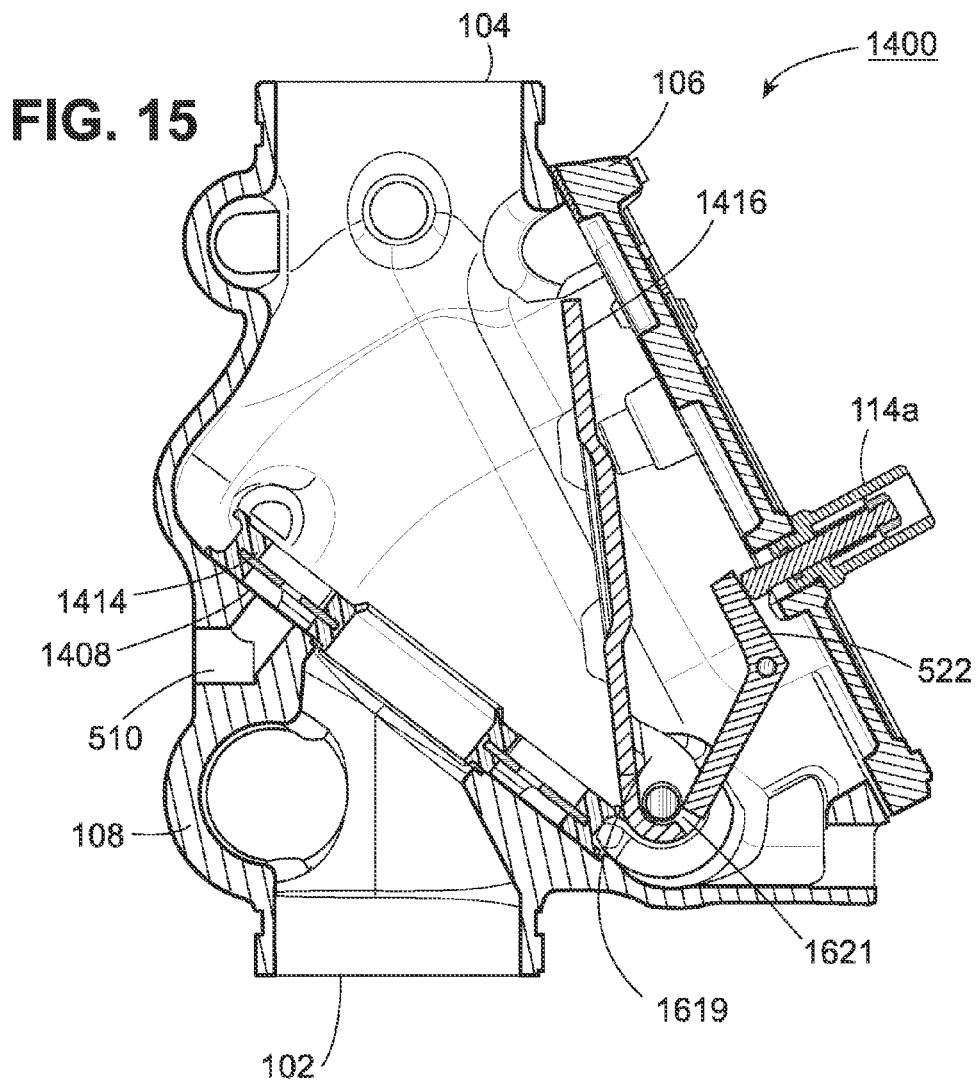
FIG. 15 is a view of the section shown in FIG. 14 with the clapper in an open, tripped position.

A typical dry pipe valve may include a clapper which is formed from machining operations. However, as shown in FIGS. 14 and 15, another embodiment of a dry pipe valve 1400 is provided having a clapper 1416 which is preferably formed by a stamping process. In such a stamping process, secondary machining steps can be eliminated. Among other benefits that will be recognized by those of ordinary skill in the art is that a clapper formed in a stamping process is expected to be less costly to manufacture than a clapper formed in a machining process. Another benefit of a stamped clapper is that it can be made from less material than a machined version, thereby making the stamped version lighter, possibly permitting the stamped clapper to be opened more quickly for a faster response time of the valve overall. Of course, other benefits of a stamped clapper will be apparent to those of ordinary skill in the art.

The valve 1400 is comprised of body 108 that was described above with reference to valve 100. Like valve 100, the valve 1400 is nominally sized according to the nominal pipe size to which the inlet port 102 and exit port 104 connect. FIG. 14 shows the clapper 1416 in the closed position, while FIG. 15 shows the clapper 1416 in an open position. As shown in FIGS. 14 and 15, the valve 1400 differs from the embodiment of the valve 100 shown in FIGS. 5 and 6 in the construction of the clapper 516, the gasket 514, and the reset mechanism 114. The reset mechanism 114a in the valve 1400 is substituted for the reset mechanism 114, clapper 1416 is substituted for clapper 516, and gasket 1414 is substituted for gasket 514. To the extent that the valves 100 and 1400 share common features, like reference numbers will be used.

Figure 16:
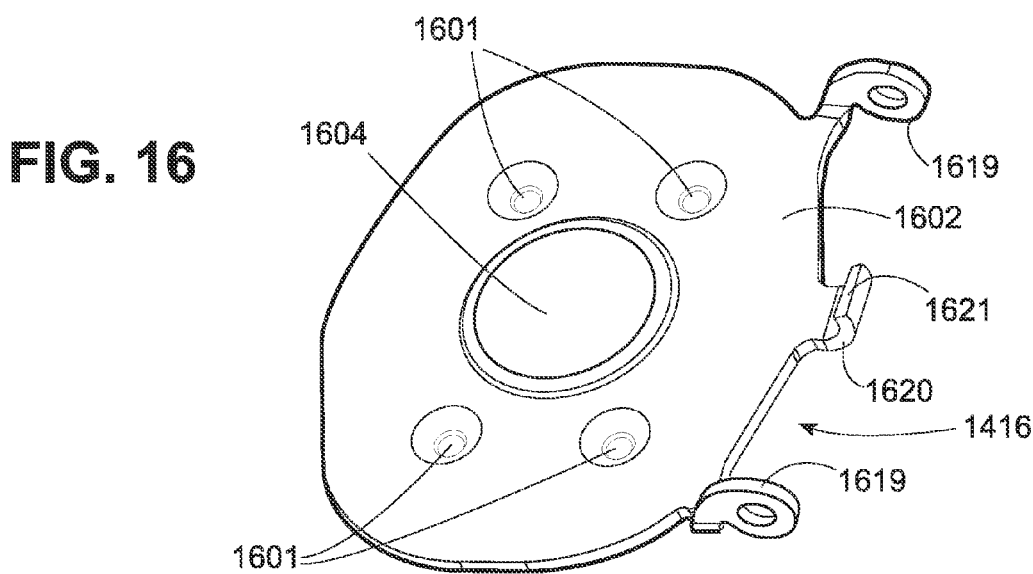
FIG. 16 is an isometric view from the top and side of the clapper included in the valve shown in FIGS. 14 and 15.

The clapper 1416 is formed from a flat blank of a metal, such as stainless steel. For example, in an embodiment of the valve having a nominal size of 4 inches, the flat blank has a thickness of about 0.25 inch. The clapper 1416 is formed by various metal forming operations, and preferably includes a stamping operation, into the net form shape of the clapper 1416 shown in FIG. 16.

The clapper 1416 includes stamped projections or dimples 1601 extending from the inlet side 1600 and the exit side 1602 of the of the clapper 1416. For example, FIG. 19 shows a view of a plurality of projections 1601 along section B-B shown in FIG. 17. As shown in FIG. 19, the projections 1601 extend a predetermined distance in the inlet direction from the inlet side 1600. Each of the projections 1601 are constructed to be received into corresponding ones of counterbored holes 2014 (FIGS. 20 and 21) formed in the gasket 1414 when the clapper is in a closed position. In one embodiment where the valve has a nominal size of 4 inches the dimples 1601 have a diameter of 0.5 inch and a depth/height of 0.25 inch. The projections 1601 can limit the amount of compression that the clapper 1416 can apply to the air lip 2004 and water lips 2002 of the gasket 1414.

Figure 20:
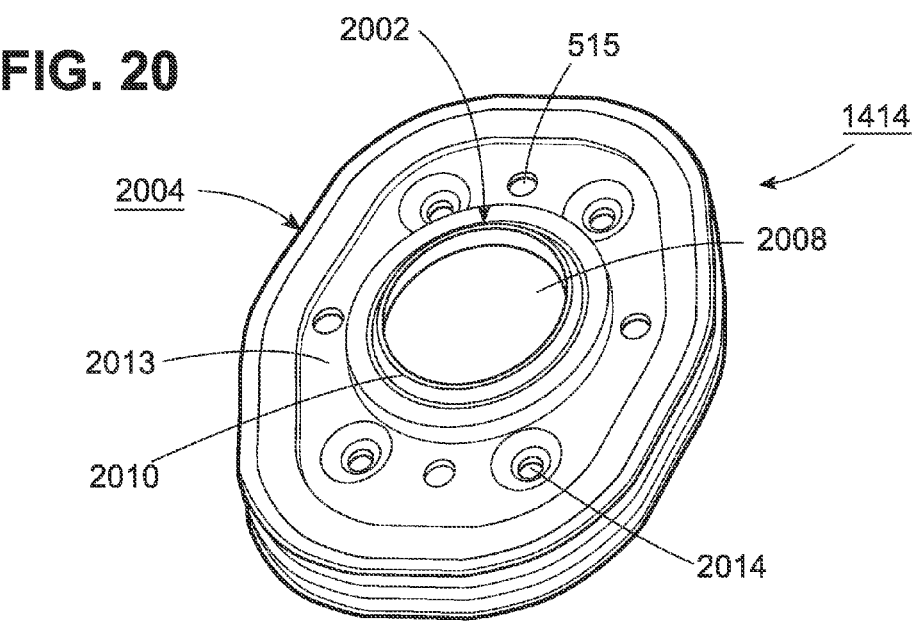
FIG. 20 is an isometric view from a top and a side of the gasket of the valve shown in FIGS. 14 and 15.

As shown in FIG. 18, also stamped into the inlet side 1600 of the clapper 1416 is a central circular depression 1603. On the outlet side 1602 of the clapper 1416 the depression 1603 forms a corresponding protrusion 1604. The depression 1603 has a frustoconical sidewall 1605 and a substantially flat bottom 1606. In one embodiment where the valve has a nominal size of 4 inches the angle between the sidewall 1605 and the bottom 1606 is about 45 degrees and the depth of the depression 1603 is about 0.20 inch. The sidewall 1605 and bottom 1606 of the depression 1603 are formed having dimensions to seal against surfaces of the water lip 2002 extending from the outlet side of the gasket 1414. Moreover, the depression 1603 is formed to self-align with the frustoconical portion 2010 (FIG. 20) of the water lip 2002 (FIG. 20).

The clapper includes hinges 1619 which are formed to extend substantially perpendicular to the plane of the rest of the clapper 1416. Also formed in the clapper 1416 is a boss 1620, which is formed by bending a tab of the flat blank out of the plane of the blank in the output direction. The boss 1620 includes a notch 1621 which is constructed to engage latch 522 upon rotation of the clapper 1416 a predetermined angular displacement from the gasket 1414, as shown in FIG. 15. The operation of latch 522 with boss 1620 and the reset mechanism 114a corresponds to the operation of is the same as described above in connection with corresponding elements shown in FIGS. 5 and 6.

The gasket 1414 will now be described in greater detail with reference to FIGS. 20-22. The gasket 1414 is formed of an elastomeric water lip 2002 and air lip 2004 and a metal plate 2013 between the air lip 2004 and the water lip 2002. The metal plate 2013, the air lip 2004, and water lip 2002 are substantially co-planar. The metal plate 2013 has an outer edge 2020 (FIG. 22) surrounded by the air lip 2004 and has an inner edge 2021 (FIG. 22) surrounded by the water lip 2002. While the metal plate 2013, air lip 2004, and water lip 2002 are shown in the embodiment in FIGS. 20-22 as having particular overall shapes, it will be appreciated that the gasket, air lip and water lip may have other shapes as will be appreciated by those of ordinary skill in the art.

Figure 21:
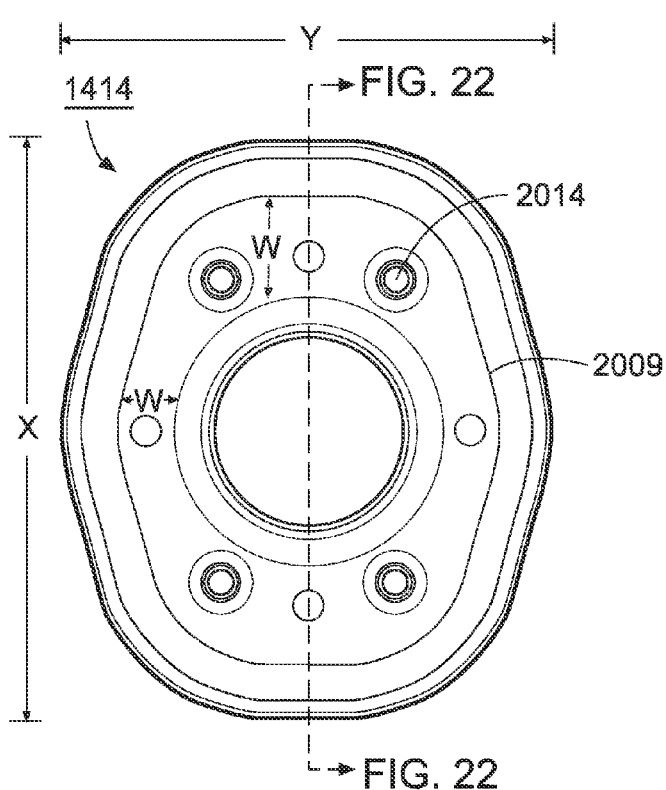
FIG. 21 is a top plan view of the gasket shown in FIG. 20.

As shown in FIG. 21, the air lip 2004 and the water lip 2002 are spaced from each other by a distance "W", which is shown in the embodiment as being a non-uniform distance around the water lip 2002. However, in other embodiments, the spacing W may be uniform. Moreover, in one embodiment where the spacing W is non-uniform and the nominal size of the valve is 4 inches, the ratio of the largest spacing to the smallest spacing is within the range from 0.843 inches to 1.563 inches. The spacing between the air lip 2004 and the water lip 2002 can be configured to benefit some aspects of the invention.

The space between the air lip 2004 and the water lip 2002 defines an area of the clapper 1416 which, when exposed to an intermediate pressure between the clapper 1416 and the gasket 1414, exerts a force on the clapper 1416 tending to open the clapper 1416. As the surface area between the air lip 2004 and water lip 2002 increases, so does the force exerted on the clapper 1416 as a result of the intermediate pressure. Accordingly, by varying the spacing between the air lip 2004 and water lip 2002, the pressure needed to keep the clapper 1416 closed in the set-up position can be effectively reduced.

Moreover, the spacing between the air lip 2004 and water lip 2002 can be varied to make the valve 1400 more compact. For example, the larger spacing W along the major dimension "X" between the air lip 2004 and water lip 2002 in FIGS. 20-22 allows for a more compact gasket 1414 and clapper 1416 along the minor "Y" dimension, while still providing a differential of at least 5:1.

Figure 22:
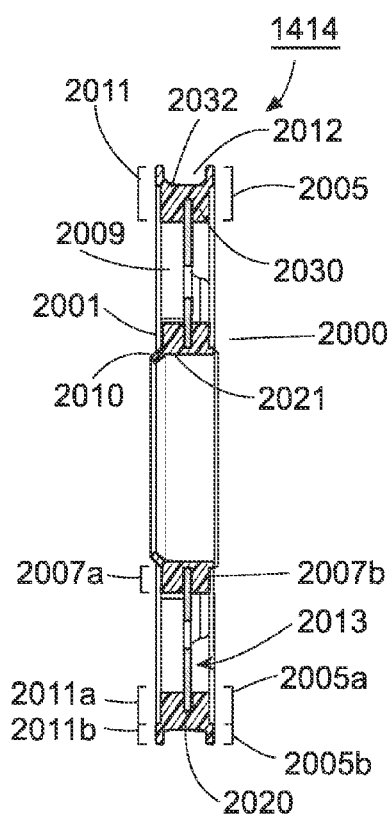
FIG. 22 is a section of the gasket shown in FIG. 21 along section labeled "FIG. 22-FIG. 22" shown in FIG. 21.

While the gasket 1414 shown in the particular example embodiment in FIGS. 20-22 has a generally polygonal outer shape, the gasket is not limited to a polygonal shape, and other gasket shapes are possible and are within the scope of this disclosure. The gasket 1414 shown in FIGS. 20-22 has a generally rectangular shape, and more specifically, the gasket has a modified rectangular shape, having rounded corners and has a bulge at the center along a minor dimension Y. For example, in one example embodiment where the nominal size of the valve is 4 inches the major dimension "X" of the gasket 1414 is about 9.125 inches and the minor dimension "Y" is about 7.75 inches.

As shown in FIGS. 20 and 21 the metal plate 2013 includes a plurality of counterbored holes 2014 which are located in a recessed groove 2009 formed between the water lip 2002 and the air lip 2004. The counterbored holes 2014 are used for attaching the gasket 1414 to the gasket flange 508 with fasteners (not shown). The holes 2014 are counterbored to recess portions of such fasteners below or flush with the surface of the metal plate 2013. The metal plate 2013 provides structural rigidity to the gasket 1414 and acts as a backing plate to spread the compressive force from the fasteners from the plate 2013 to the water lip 2002 and the air lip 2004 and prevents warping of the gasket 1414. The metal plate 2013 also includes through holes 515, which communicate with alarm port 510 when the gasket 2014 is attached to the valve body 108.

In one embodiment, the metal plate 2013 is formed from a stainless steel, and the elastomeric air lip 2004 and water lip 2002 are formed of rubber, which is vulcanized onto the metal plate 2013. For example, the air lip 2004 and water lip 2002 can be made of various types of materials including silicone, ethylene propylene diene monomer rubber (EPDM), and fluoroelastomers, such as various types of FKMs defined in ASTM D1418, including Viton® rubber (manufactured by DuPont Performance Elastomers L.L.C., of which Viton is a registered trademark). The air lip 2004 and water lip 2002 are formed of suitable material to seal with the gasket flange 508 and the clapper 1416.

The gasket 1414 has an inlet side 2000 (FIG. 22) and an exit side 2001. The water lip 2002 is constructed to be received in and seal with the depression 1603 of the clapper 1416 in its closed position (FIG. 15) to prevent the pressurized fluid supply (e.g., water) from escaping past the clapper 1416. The gasket 1414 has an inner circular opening 2008 defined by the water lip 2002. In one example embodiment where the nominal size of the valve is 4 inches, the diameter of the opening 2008 defined by the water lip 2002 can be about 3.2 inches. The water lip 2002 has a frustoconical portion 2010 extending from the exit side 2001 of the gasket 1414 (this feature is easiest to see in profile in the cross-section shown in FIG. 22). In one embodiment, the frustoconical portion 2010 tapers radially inwardly at about 50 degrees with respect to the plane of the gasket 1414. Of course while the cross-section of the water lip 2002 is shown in FIG. 22 as having a frustoconical shape, other cross-sections are possible, such as, a cross-section having an arcuate shape.

As shown in greater detail in FIG. 22, the water lip 2002 also has annular flanges 2007*a* and 2007*b* extending radially outward forming a groove in which an inner edge 2021 of the metal plate 2013 is received. On the inlet side 2000 of the gasket 1414, the annular flange 2007*b* is designed to contact the gasket flange 508. For example, in one example embodiment, the annular flanges 2007*a* and 2007*b* may each have an annular width of about 0.2 inch.

Also, as shown in FIG. 22, the air lip 2004 is formed substantially as a channel which surrounds the outer edge 2020 of the metal plate 2013. The air lip 2004 has an inner U-shaped groove 2030 that receives the outer edge 2020 of the metal plate 2013. The air lip 2004 also has an outer V-shaped groove 2012 opposite the groove 2030. The inner groove 2030 and outer groove 2012 are defined by air lip flanges 2011 and 2005 and base 2032, which separates the inner and outer grooves. The inner groove 2030 is defined by air lip flange portions 2011*a* and 2005*a* which extend inwardly from the base 2032. The outer groove 2012 is defined by air lip flange portions 2011*b* and 2005*b* which extend outwardly from the base 2032. The air lip flange portions 2011*b* and 2005*b* extend at a slight angle with respect to portions 2011*a* and 2005*a*, respectively, to form the V-shaped groove 2012. In one example embodiment, the dimensions of air lip flanges 2011 and 2005 are substantially equal. For example, in one embodiment where the nominal size of the valve is 4 inches, the width of the air lip flanges 2011 and 2005 is about 0.875 inch, the thickness of the gasket 1414 between the air lip flange portions 2011*b* and 2005*b* is about 0.75 inch, and the thickness of the gasket 1414 between the air lip flange portions 2011*a* and 2005*a* is about 0.50 inch. The air lip flange 2011 is constructed to contact an area of the clapper 1416 proximate its outer edge in its closed position to seal pressurized fluid (e.g., air) downstream of the clapper 1416.

The gasket 1414 has been described as having structural features that will be appreciated by those of ordinary skill in the art as being similar to those of the gasket 514 shown in FIGS. 8-10. However, the gasket 1414 differs from gasket 514 with regard to dimensional details to accommodate differences between the clapper 1416 and clapper 516. For example, as discussed above, for an embodiment of the valve 100 having a nominal size of 4 inches, the thickness of the gasket 514 between the air lip flange portions 811*b* and 805*b* is about 0.375 inch. However, the corresponding dimension for the gasket 1414 used in valve 1400 having the same valve body 108 as used in valve 100 is 0.75 inch. Moreover, the annular flange 2007*a* of the air lip 2002 in FIG. 20 has an axial dimension (perpendicular to metal plate 2013) that extends farther from the surface of the metal plate 2013 than does the flange 807*a* from the metal plate 813.

The principle of operation of the valve 1400 shown in FIGS. 14 and 15 is the same as the valve 100, and therefore a repeated discussion of that operation is omitted for the sake of brevity.

As discussed hereinabove, the clapper 1416 is preferably formed in a process which includes a stamping operation. One example embodiment of a method of producing the clapper 1416 includes cutting a flat blank from a sheet of stainless steel, deburring the flat blank, forming and embossing the protrusions 1601, depression 1603, and hinges 1609, and piercing openings in the hinges 1609. Cutting is preferably performed by laser cutting, and deburring is preferably performed by hand or by tumbled deburring. Since the clapper 1416 resulting from these operations is formed from a flat blank, the surface of the inlet side 1600 of the clapper 1416 remains substantially planar, with the exception of the protrusions 1601, the depression 1603, hinges 1619, and boss 1620.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

Therefore, while the invention has been shown and described with respect to example embodiments thereof, it will be understood by those skilled in the art that changes in form and details may be made to these embodiments without departing from the scope and spirit of the invention. In this regard, various dimensions of features of an embodiment of a differential dry pipe valve have been disclosed. However, departure from these dimensions may be made by those of ordinary skill in the art based on factors including the nominal size of the valve and the desired differential pressure ratio. Such dimensional modifications to the embodiments can be made without departing from the scope and spirit of the invention.

What is claimed is:

1. A differential dry pipe valve, comprising:
    a body including an inlet chamber having an inlet port, an exit chamber having an exit port, and a gasket flange attached to the body between the inlet chamber and the exit chamber, the gasket flange having a sealing surface and surrounding a through-opening on the body, the inlet and exit ports being substantially coaxial;
    a gasket attached to the gasket flange, the gasket having an inner water lip in fluid communication with the inlet chamber and an outer air lip surrounding the water lip, wherein the spacing between the water lip and air lip varies, wherein the gasket has a shape generally matching the gasket flange; and
    a clapper hingedly attached to the body and pivotally movable between a closed position, in which the clapper is sealed against the water lip and the air lip, and an open position, in which the clapper is not sealed against the water lip and the air lip, the clapper being attached to the body such that the clapper is movable from the closed to the open position based on a differential in pressure between the inlet chamber and the exit chamber.

2. The valve according to claim 1, wherein, when the clapper is in the open position, the inlet port and the exit port are in fluid communication and define a substantially straight path for fluid flow along an axis passing through the inlet port and the exit port.

3. The valve according to claim 1, wherein the clapper is generally polygonal.

4. The valve according to claim 3, wherein the clapper is generally rectangular.

5. The valve according to claim 1, wherein the air lip is generally polygonal and the water lip is circular.

6. The valve according to claim 5, wherein the air lip is generally rectangular.

7. The valve according to claim 1, wherein the water lip includes a frustoconical edge.

8. The valve according to claim 7, wherein the clapper includes a central recess having a frustoconical peripheral surface constructed to receive and seal with the frustoconical edge of the water lip.

9. The valve according to claim 1, wherein the body includes a removable cover having a latching mechanism attached thereto, the latching mechanism constructed to prevent the clapper from moving from the open position to the closed position.

10. The valve according to claim 9, wherein the removable cover disposes the latching mechanism proximate the hinged connection of the clapper.

11. The valve according to claim 9, wherein the cover also includes a reset mechanism connected to the latching mechanism, the reset mechanism constructed to reset the latching mechanism to permit the clapper to move from the open position to the closed position.

12. The valve according to claim 11, wherein the latching mechanism includes a lever pinned to the cover of the body proximate the hinged connection of the clapper.

13. The valve according to claim 12, wherein the reset mechanism includes a push rod having a first end extending through the cover and constructed to engage a first end of the lever of the latching mechanism, the push rod having a second end extending outside the valve.

14. The valve according to claim 13, wherein a second end of the lever of the latching mechanism is constructed to engage the clapper.

15. The valve according to claim 14, wherein the clapper includes a boss proximate to the hinged connection, the boss having a notch formed therein constructed to engage the second end of the lever at least when the clapper is in the open position.

16. The valve according to claim 1, wherein the gasket flange is oriented at an acute angle with respect to the axis.

17. The valve according to claim 16, wherein the gasket flange is oriented at an angle between 30 and 60 degrees with respect to the axis.

18. The valve according to claim 17, wherein the gasket flange is oriented at 50 ±5 degrees with respect to the axis.

19. The valve according to claim 1, wherein the gasket includes at least one through opening between the inlet side and exit side of the gasket.

20. The valve according to claim 19, wherein the through opening is located in a recessed groove between the water lip and the air lip.

21. The valve according to claim 19, wherein the body further includes an alarm port exposed to ambient pressure, the alarm port in communication with at least one through opening in the gasket flange of the body, wherein at least one of the through openings in the gasket are in communication with the alarm port via the at least one opening in the gasket flange.

22. The valve according to claim 21, wherein when the clapper is in the closed position, the volume between the clapper and alarm port defines an intermediate chamber at ambient pressure.

23. The valve according to claim 1, wherein the pressure ratio between the exit chamber and the inlet chamber necessary to maintain the clapper in the closed position is at least 5 to 1.

24. The valve according to claim 1, wherein the gasket includes a metal plate and an elastomer substantially surrounding the metal plate.

25. The valve according to claim 24, wherein the elastomer is composed of at least one of rubber, EPDM, and viton.

26. The valve according to claim 24, wherein the metal plate is composed of at least one of stainless steel, copper, brass, titanium, and galvanized steel.

27. A sprinkler system comprised of:
a differential dry pipe valve, comprised of:
a body including an inlet chamber having an inlet port, an exit chamber having an exit port, and a gasket flange attached to the body between the inlet chamber and the exit chamber, the gasket flange having a sealing surface and surrounding a through-opening on the body, the inlet and exit ports being substantially coaxial;
a gasket attached to the gasket flange, the gasket having an inner water lip in fluid communication with the inlet chamber and an outer air lip surrounding the water lip, wherein the spacing between the water lip and air lip varies, wherein the gasket has a shape generally matching the gasket flange; and
a clapper hingedly attached to the body and pivotally movable between a closed position, in which the clapper is sealed against the water lip and the air lip, and an open position, in which the clapper is not sealed against the water lip and the air lip, the clapper being attached to the body such that the clapper is movable from the closed to the open position based on a differential pressure between the inlet chamber and the exit chamber; and
at least one fire protection sprinkler in fluid communication with the exit port.

28. The sprinkler system according to claim 27, wherein when the clapper is in the open position, the inlet port and the exit port are in fluid communication and define substantially straight path for fluid flow along an axis passing through the inlet port and the exit port.

29. The valve according to claim 1, wherein the clapper is formed in a process which includes a stamping operation.

30. The valve according to claim 1, wherein gasket has a lower side facing the gasket flange and wherein at least one of the water lip and the air lip has a respective lower portion on the lower side of the gasket that seals with the gasket flange.

31. The valve according to claim 1, wherein the gasket is fastened to the gasket flange with at least one fastener.

32. The valve according to claim 31, wherein the gasket includes at least one through opening disposed between the air lip and the water lip constructed to receive a fastener therethrough.

33. The valve according to claim 9, wherein the latching mechanism is constructed to fix the clapper in an open position to prevent the clapper from moving from the open position to the closed position.

34. The valve according to claim 1, wherein the air lip and the water lip are coaxial with the inlet and exit ports.

* * * * *